(12) United States Patent
Tsatsanis et al.

(10) Patent No.: US 8,139,658 B2
(45) Date of Patent: Mar. 20, 2012

(54) METHOD AND SYSTEM FOR PROVIDING A TIME EQUALIZER FOR MULTILINE TRANSMISSION IN COMMUNICATION SYSTEMS

(75) Inventors: Michail Tsatsanis, Huntington Beach, CA (US); Ming Gu, Holmdel, NJ (US); Thorkell Gudmundsson, San Jose, CA (US)

(73) Assignee: Tokyo Electron Limited, Tokyo (JP)

( * ) Notice: Subject to any disclaimer, the term of this patent is extended or adjusted under 35 U.S.C. 154(b) by 1515 days.

(21) Appl. No.: 10/517,094

(22) PCT Filed: Jun. 6, 2003
(Under 37 CFR 1.47)

(86) PCT No.: PCT/US03/18129
§ 371 (c)(1),
(2), (4) Date: Sep. 14, 2007

(87) PCT Pub. No.: WO03/105431
PCT Pub. Date: Dec. 18, 2003

(65) Prior Publication Data
US 2011/0206108 A1 Aug. 25, 2011

Related U.S. Application Data

(60) Provisional application No. 60/387,303, filed on Jun. 7, 2002, provisional application No. 60/387,098, filed on Jun. 7, 2002, provisional application No. 60/398,860, filed on Jul. 25, 2002, provisional application No. 60/403,874, filed on Aug. 16, 2002.

(51) Int. Cl.
*H04K 1/10* (2006.01)

(52) U.S. Cl. .................................... 375/260; 375/346
(58) Field of Classification Search ................. 375/260, 375/346, 350
See application file for complete search history.

(56) References Cited

U.S. PATENT DOCUMENTS

| | | |
|---|---|---|
| 4,408,332 A | 10/1983 | Sari |
| 5,870,432 A | 2/1999 | Kerckhove |
| 5,887,032 A | 3/1999 | Cioffi |
| 6,341,298 B1 | 1/2002 | Ilani |
| 6,353,636 B1 * | 3/2002 | Tate et al. ............ 375/260 |
| 6,396,886 B1 | 5/2002 | Kapoor |

FOREIGN PATENT DOCUMENTS

| WO | 9943123 | | 8/1999 |
|---|---|---|---|
| WO | WO 99/43123 | * | 8/1999 |

OTHER PUBLICATIONS

Michael L. Honig, Pedro Crespo, & Kenneth Steiglitz, Suppression of Near- and Far-End Crosstalk by Linear Pre- and Post-Filtering, IEEE Journal on Selected Areas in Communications, vol. 10, No. 3, (16 pages), Apr. 1992.

European Patent Office, Supplementary European Search Report, Application No. 00993153.6, dated May 2, 2007 (3 pages).

* cited by examiner

*Primary Examiner* — Kevin Kim
(74) *Attorney, Agent, or Firm* — Wood, Herron & Evans, LLP

(57) ABSTRACT

A method and system for multiline transmission in communications systems are described. Eigenvalues are calculated to maximize equalized channel impulse response (1010). Eigenvectors associated with dominant eigenvalues are identified (1020). The eigenvectors are combined into a subspace. Optimization is performed over the subspace to calculate subspace time equalizer coefficients (1030).

56 Claims, 13 Drawing Sheets

METHOD AND SYSTEM FOR PROVIDING A TIME EQUALIZER FOR MULTILINE TRANSMISSION IN COMMUNICATION SYSTEMS

This application is a U.S. National Stage application of International Patent Application No. PCT/US03/18129, filed on Jun. 6, 2003, which claims the benefit of the filing date of the following Provisional U.S. Patent Applications:

A Method and System for Multiline Transmission in a Communications System, U.S. Provisional Application Ser. No. 60/387,303, filed on Jun. 7, 2002;

A Method and System for Multiline Transmission in a Communications System, U.S. Provisional Application Ser. No. 60/398,860, filed on Jul. 25, 2002;

An Analog Front End (AFE) Circuit that Improves Echo Rejection in Communications Systems, U.S. Provisional Application Ser. No. 60/387,098, filed on Jun. 7, 2002; and Vectoring Techniques for Multi-Line Communication Systems, U.S. Provisional Application Ser. No. 60/403,874, filed on Aug. 16, 2002.

FIELD OF THE INVENTION

The present invention relates generally to communication systems and, in particular to, multiple line transmission in communication systems.

BACKGROUND OF THE INVENTION

Copper infrastructure in the access network is ubiquitous and has served our voice communication needs well for over a century. As data connectivity needs have grown in the last twenty years, several technologies have been introduced to exploit this existing copper network and expand its usefulness. These include narrow-band modems, various versions of DSL, ISDN, DDS and T1/E1 technologies.

The Internet era has introduced new demands on the access network. Bandwidth demand is growing at 25% or more per year for the average enterprise. But this demand is constrained by the "service gap"—the void in services and pricing between T1 and T3 service. Creative solutions that address this gap in a cost-effective way can increase penetration (total lines in service), margins, and revenue.

T1/E1 service can now be delivered through a single copper pair using an HDSL2 or G.shdsl modem. Data services at similar or higher speeds can be delivered using ADSL. Newer versions of this technology, such as VDSL, offer speeds of more than 50 Mb/s when operating in an asymmetrical mode (more bandwidth in one direction than in the other). This is remarkable, given the fact that the copper plant was originally designed having only voice services in mind.

The difficulty has been in delivering high symmetrical speeds to all, or even the majority of customers, in a cost-effective manner. For example, at 10 Mb/s or greater speeds, VDSL has significant reach limitations and can only serve a small percentage of the customer base. Before it can be widely adopted, a major and costly re-engineering of the outside plant environment is needed to reduce the average loop length.

The vast majority of customers lie within the Customer Service Area (CSA), defined as 12,000 feet of 24AWG cable or 9,000 feet of 26AWG cable. At this range, symmetric 1.5-2.0 Mb/s service is close to the highest bit rate service that a single copper pair can deliver reliably. For speeds greater than this, fiber-based services are most commonly deployed today.

Unfortunately, fiber is not ubiquitous in the access network. Current estimates are that less than 7% of all businesses can be reached by fiber. This is expected to increase to just over 10% by 2006. Recent announcements of expansion of the fiber network by US telecommunications carriers talk about bringing fiber to an additional 1 million US customers per year for the next several years, which represents about 0.7% of the total customer base per year.

Construction of new fiber in the access network is typically focused on high-density environments such as multi-tenant office buildings in large cities. But in the Internet era, the demand for high-speed connectivity is widespread geographically.

Fiber is expensive to deploy. Construction costs can be significant as can the cost of the equipment itself. Customers located "off net" often cannot justify the up-front construction costs of fiber, not to mention the dramatically higher monthly charges for fiber-based service.

This has created the "service gap". From an enterprise perspective, the jump from traditional copper to fiber-based service is a large one. As customer demand for bandwidth continues to grow, this service gap will become increasingly apparent and problematic.

There are many limitations of the copper loop plant as a communications medium. Copper twisted pairs are usually of small gauge, resulting in significant signal power reduction over long distances. Despite this attenuation, however, the capacity of a copper twisted pair at CSA range would be well above typical T1 rates if interference and noise could be suppressed. Unfortunately, copper pairs are typically not shielded and incur substantial ingress noise and interference from other lines. This is known as crosstalk.

Often, just a single service activated in the same binder can result in a 50% reduction in the capacity of a copper pair compared to the case where no other services are present in the binder. Similarly, ingress noise from RF sources, radio stations, electric motors, etc., can result in significant performance degradation for the lines in the affected binder. The present invention significantly mitigates those limiting factors and provides dramatic bitrate improvements through the use of physical-layer coordination, commonly referred to as "vectoring".

Existing approaches to multiline transmission utilize "bonding" of multiple copper pairs. "Bonding" refers to the combination of multiple copper pairs at the digital layer. In this approach, the incoming datastream is partitioned at the transmitter end into multiple datastreams, each of which is transmitted over one of the individual copper pairs without regard to the other copper pairs. Then, these multiple datastreams are reassembled at the receiver end into a single datastream. The operations of partitioning and reassembling the datastream have the undesirable side effect of adding latency to the transmission. Moreover, since the physical layer of the individual copper pairs is left unchanged, the total bitrate is less than or equal to the sum of the bitrates of the individual pairs.

Crosstalk in a multiline system takes two distinct forms, which are addressed by different techniques. Crosstalk originating from the multiline system's own transmitters is referred to as "in-domain" crosstalk, while crosstalk originating from other sources is referred to as "out-of-domain" crosstalk. Besides crosstalk, multiline systems suffer from spectral leakage, poor time domain equalizer (TEQ) performance, poor windowing, and poor analog front end (AFE) designs.

SUMMARY OF THE INVENTION

A method and system for multiline transmission in communications systems are described. Eigenvalues are calculated to maximize equalized channel impulse response. Eigenvectors associated with dominant eigenvalues are identified. The eigenvectors are combined into a subspace. Optimization is performed over the subspace to calculate subspace time equalizer coefficients.

BRIEF DESCRIPTION OF THE DRAWINGS

Features and advantages of the prevention invention will be apparent to one skilled in the art in light of the following detailed description in which.

DETAILED DESCRIPTION

Figure 1:
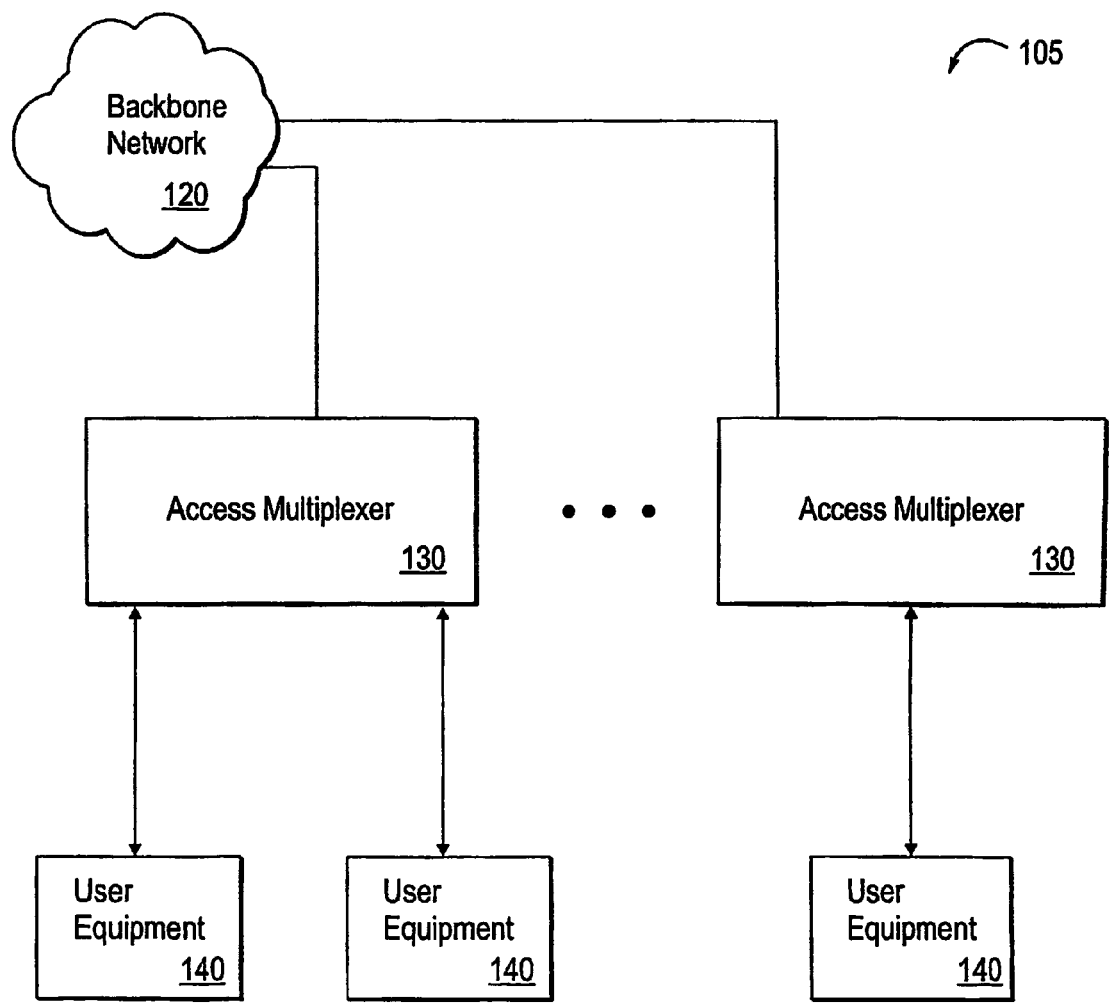
FIG. 1 illustrates an exemplary communication system 105 that may benefit from the present method and system.

A method and system for multiline transmission in communications systems are described. For purposes of discussing and illustrating the invention, several examples will be given in the context of a wireline communication system, such as DSL. However, one skilled in the art will recognize and appreciate that interference, for example, crosstalk is a problem in wired and wireless communications and that the techniques disclosed are applicable in these areas as well.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Overview of a General Communication Network

The present method and system is applicable to a variety of communication systems, for example: wireline, wireless, cable, and optical. FIG. 1 illustrates an exemplary communication system 105 that may benefit from the present method and system. The backbone network 120 is generally accessed by a user through a multitude of access multiplexers 130 such as: base stations, DSLAMs (DSL Access Mulitplexers), or switchboards. The access multiplexers 130 communicate with the network users. The user equipment 140 exchanges user information, such as user data and management data, with the access multiplexer 130 in a downstream and upstream fashion. The upstream data transmission is initiated at the user equipment 140 such that the user data is transmitted from the user equipment 140 to the access multiplexer 130. Conversely, the downstream data is transmitted from the access multiplexer 130 to the user equipment 140. User equipment 140 may consist of various types of receivers that contain modems such as: cable modems, DSL modems, and wireless modems. In this network access system the current method and system may be practiced to identify sources of interference in the access channels.

For illustration purposes and in order not to obscure the present method and system, an example of a communication system that may implement the present method and system, in one embodiment, is given in the area of DSL communication systems. As such, the following discussion, including FIG. 2, is useful to provide a general overview of the present method and system and how the method and system interacts with the architecture of the DSL system.

Overview of DSL Example

DSL is to be understood to refer to a variety of Digital Subscriber Line (DSL) standards that, even now, are evolving. Each DSL standard will be referred to as a DSL service type. At the present time, DSL service types include, but are not limited to, ADSL, SDSL, HDSL, and VDSL (Asymmetrical, Symmetrical, High speed, and Very high speed DSL respectively).

Figure 2:
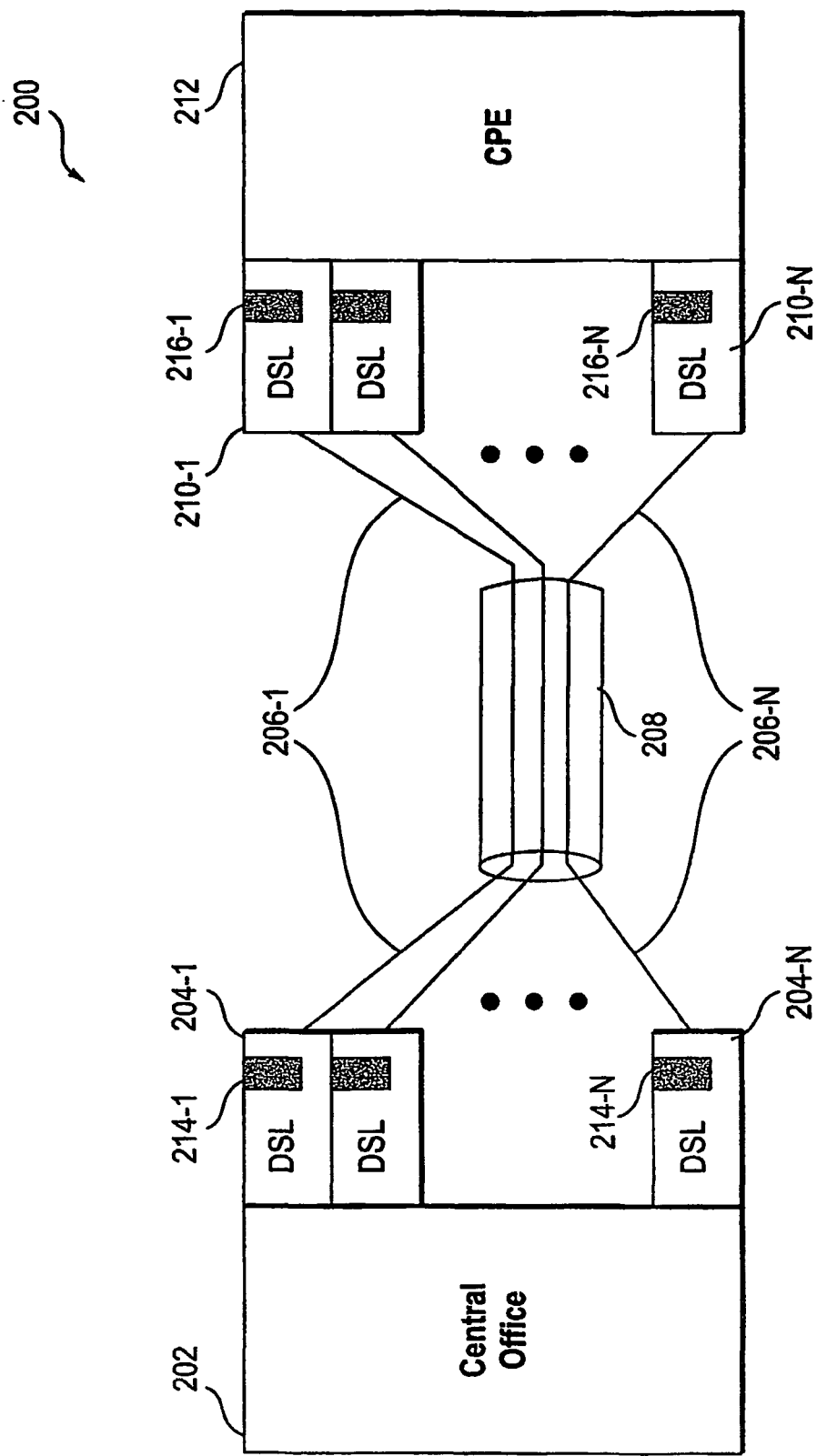
FIG. 2 illustrates a communication system in which the present method and system may be practiced.

FIG. 2 illustrates a communication system 200, in which the present method and system may be practiced. A central office 202 has a series of DSL modems 204-1 through 204-N, including transceivers 214-1 through 214-N, connected via twisted pairs 206-1 through 206-N as a bundle 208 connected to customers DSL 210-1 through 210-N, including transceivers 216-1 through 216-N, which is connected respectively to customer's premise equipment (CPE) 212, such as a local area network or computer. One skilled in the art recognizes that twisted pair bundle 208 may experience crosstalk between the twisted pairs 206-1 through 206-N and depending upon the services carried by pairs, data rates, and other factors, such as proximity of the pairs to each other, etc., there may be varying and different amounts of crosstalk on pairs.

Figure 3:
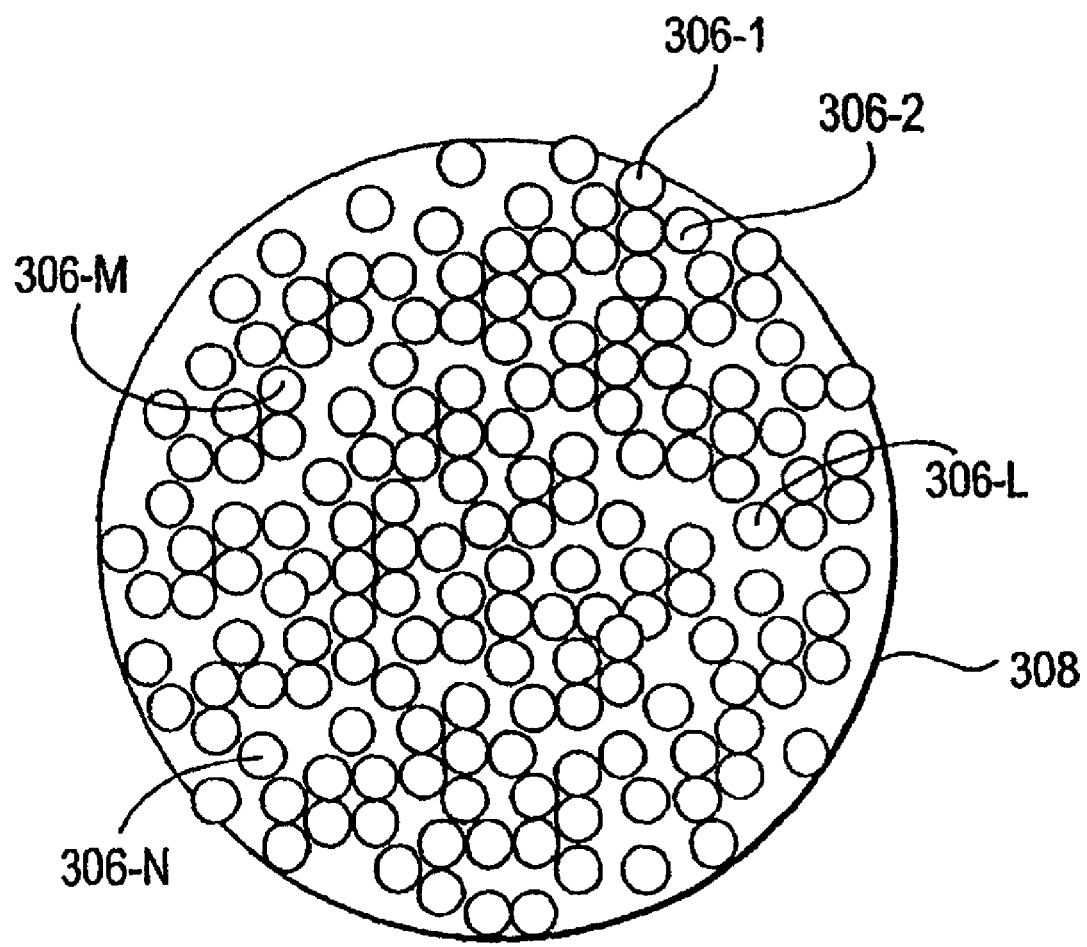
FIG. 3 illustrates a bundle of pairs used in communication system, with which the present method and system may be practiced.

For example, FIG. 3 illustrates a bundle (also called a binder) 308, having twisted pairs 306-1 through 306-N. Pair 306-1 may be expected to experience more crosstalk from a pair 306-2 closer to it than more distant 306-L. Likewise, pair 306-2 located on the perimeter of the bundle 308 may experience different crosstalk than a pair 306-M more toward the center of the bundle 308. Additionally, if pair 306-1 was the only DSL service pair and now pair 306-M is placed into DSL service, there may be new crosstalk due to this activation. Also the type of DSL service (i.e. SDSL, etc.) may have an effect on crosstalk. In general, each DSL service type occupies a band limited frequency region. If pairs in proximity to each other are conveying information in different frequency bands, then there may be less crosstalk than if pairs are conveying information in the same frequency band. For purposes of discussion, co-channel is used to describe the physical coupling between two interfering pairs. This coupling may be represented by a linear dynamic system that will also be called a co-channel.

In order to illustrate the present method and system, as mentioned above, the use in a DSL system will be described and discussed, however as also mentioned above, one is to understand that one of ordinary skill in the art will recognize that the techniques presented are not limited to DSL and may be used in all manner of communication both wired and wireless.

Crosstalk in a Multiline Communication System

The present method and system describes multiline transmissions in a communication system that deliver fiber-like services by combining multiple copper pairs. This method and system enables carriers to offer high-rate services to the majority of their customers using their existing copper plant infrastructure. The business benefits to the carriers are significant. High-speed copper-based services can be delivered for less than half the cost of traditional T3 over fiber, significantly reducing capital expenditures and improving margins. True Fractional T3 (FT3) service and next-generation Ethernet service as well as the services targeted by the recent standards efforts by IEEE's Ethernet for the First Mile (EFM) and T1 E1.4 Multi-megabit Multi-loop DSL (MMDSL) committees, are enabled and ideally suited for delivery using a multiline technology platform. For the enterprise, carrier services based on this technology can be available broadly and without high non-recurring costs.

Figure 4:
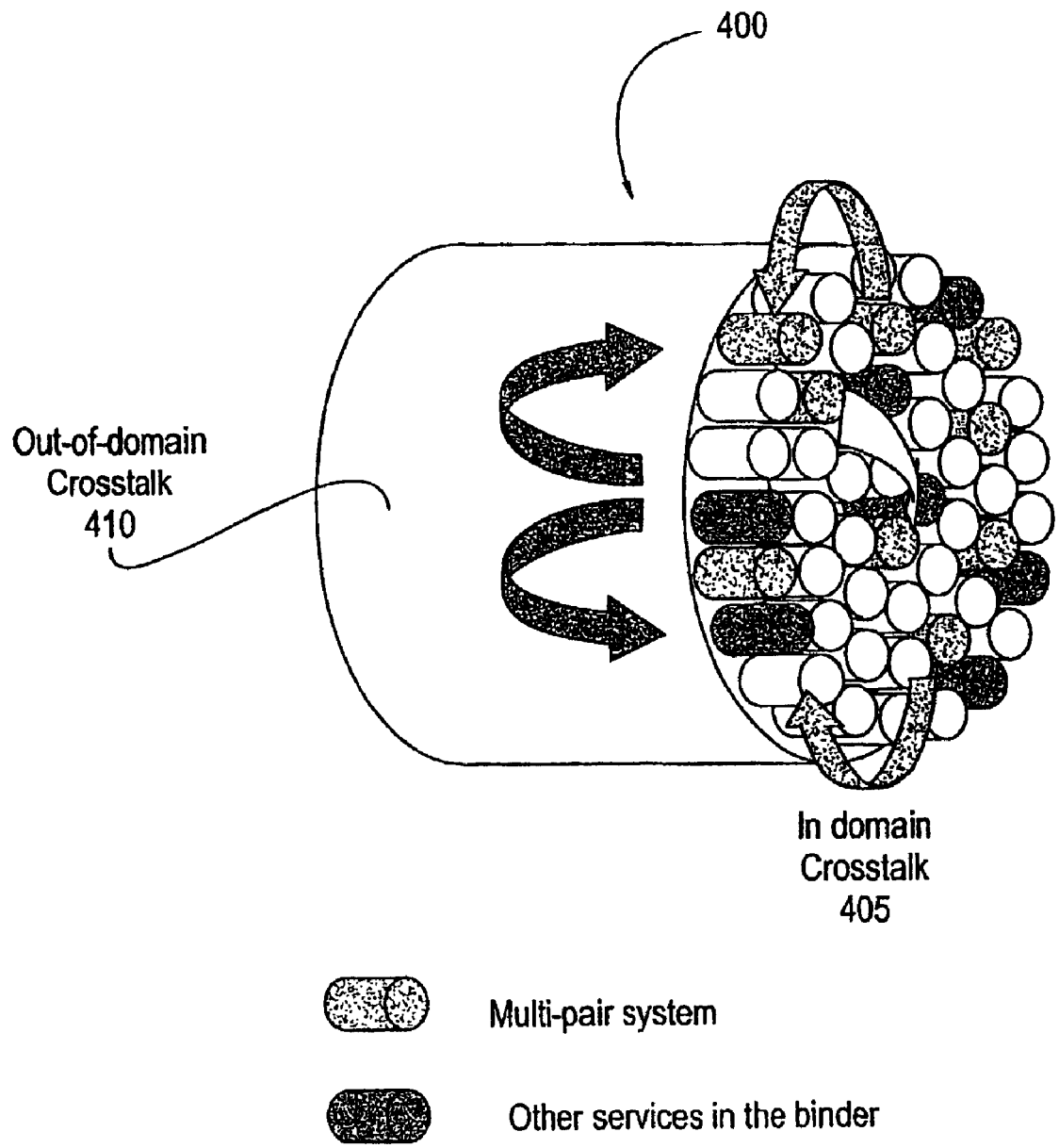
FIG. 4 illustrates the in-domain and out-of-domain components of the crosstalk noise in a multiline transmission system deployed in a binder of copper pairs.

The present method and system coordinates the transmission of synchronized waveforms across multiple pairs, and jointly processes the received signals on all the pairs at the receiver end. This Multiple Input Multiple Output (MIMO) scheme takes advantage of the interdependencies of signals traveling along adjacent lines to mitigate the effects of crosstalk, thereby resulting in impressive performance gains compared to existing approaches. FIG. 4 illustrates one embodiment of a binder 400 having multiple lines experiencing crosstalk.

It is possible to mitigate the effect of Near-End Crosstalk (NEXT) originating from in-domain lines 405, because the signals of the interfering transmitters are known and thus their effect can be cancelled from the affected receivers. This cancellation is based on identifying the precise filter that has to be applied to the interfering transmitted signal to match the exact opposite of the received interference. The principle is the same as that used for echo cancellation in single-pair transceivers, but in this case it involves additional complexities associated with a full matrix of crosstalk cancellation filters, from each transmitter to each receiver in a system with two lines or more.

When crosstalk originates from out-of-domain lines 410, on the other hand, the receiver has no access to the interfering transmitter. Therefore, the mitigation of out-of-domain crosstalk signals is more challenging. Despite its difficulty, addressing out-of-domain crosstalk is essential to achieving higher bitrates in a multiline system. Without it, in-domain crosstalk cancellation is of little benefit, because there is no guarantee that the in-domain component of the interference will be stronger than the out-of-domain component.

The present method and system mitigates the out-of-domain component of the interference noise by identifying its spectral signature matrix across multiple lines, and then pre-whitening the received noise signal across these multiple lines through the application of an appropriate pre-processing matrix to the outgoing signals prior to transmission, and of the corresponding post-processing matrix to the received signals before decoding them.

This joint processing of signals has the effect of trading off Signal-to-Noise Ratios (SNRs) across lines and across frequencies in order to reach the maximum data carrying capacity of the channel. In effect, the interference noise is "pushed" onto a few dimensions of the signal space of the multiline transmission medium, and the remaining subspace that is orthogonal to the noise is exploited to carry signals that are essentially free of interference, thereby significantly increasing the overall capacity of the multiline system.

In addition, the joint processing of signals has the effect of eliminating the Far-End Crosstalk (FEXT) originating from in-domain lines. This is achieved by identifying the transmission matrix from all transmitters to all receivers, and using it to jointly process the signals from each transmitter across all the receivers.

The fact that the aforementioned "clean" subspace is orthogonal to the interference noise, and therefore not impaired by it, exposes additional issues that are not present in conventional transceivers. These issues involve spectral leakage effects in frequency-domain-based transmission schemes, suboptimal Time Equalizer (TEQ) designs, and suboptimal Analog Front End (AFE) designs. Their detrimental effects are not significant in conventional copper transmission systems, where they are masked by the much stronger effects of interference noise. However, in the method described in the present method and system, their effects are dominant in the "clean" subspace, because that subspace is free of interference noise. The present method and system describes methods for improving these designs and mitigating their detrimental effects on the performance of the multiline transmission system.

The present method and system discloses coordinated transmission over multiple copper pairs. The claimed method and system:

eliminates in-domain FEXT by jointly processing the signals from each transmitter across all the receivers;

cancels in-domain NEXT in overlapping-frequency transmission schemes by using a matrix of crosstalk cancellation filters;

eliminates in-domain NEXT in Frequency-Division Multiplexed (FDM) transmission schemes by utilizing well-known "Zipper" techniques, which involve adding a suffix at the end of the transmitted frame and appropriately synchronizing the transmitters and receivers on both ends of the multiline system;

mitigates out-of-domain NEXT and FEXT by pre-whitening the noise across the multiple receivers and exploiting the subspace that is orthogonal to the interference noise;

mitigates the effects of spectral leakage from out-of-domain crosstalk through the use of receiver-only windowing techniques;

improves TEQ performance through the use of subspace-based designs that address additional optimization criteria; and improves AFE performance through the use of a new hybrid balancing design and systematic optimization techniques.

1. MIMO Processing

The claimed method and system is applicable to both frequency-domain transmission schemes, such as the Discrete Multi-Tone (DMT) scheme defined in the G.dmt and G.lite standards of the International Telecommunications Union (ITU), and time-domain transmission schemes, such as the 2B1Q scheme defined in the HDSL standard of the American National Standards Institute (ANSI). The preferred embodiment is with frequency-domain schemes, because the MIMO processing can be performed much more efficiently in the frequency domain, where it reduces to a simple matrix multiplication in each of the independent frequency bins.

Figure 5:
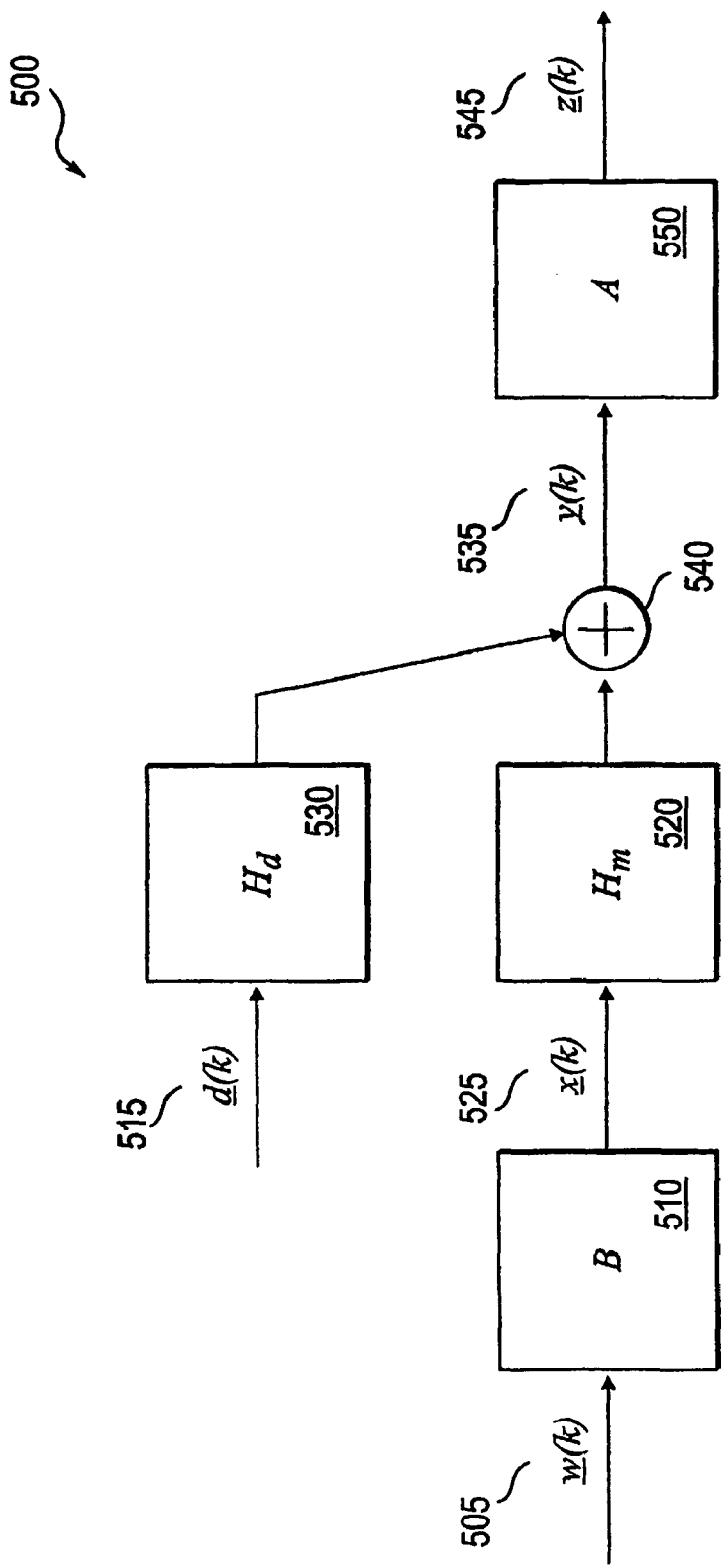
FIG. 5 illustrates an exemplary functional block diagram of MIMO processing according to one embodiment of the present invention.

To understand the structure of the MIMO processing, examine one frequency carrier or "tone" in a DMT system. The small frequency bands surrounding these individual "tones" are called frequency "bins." FIG. 5 illustrates an exemplary functional block diagram 500 of MIMO processing according to one embodiment of the present invention. The MIMO processing can be performed by a transceiver in any modem of FIG. 2. Referring to the block diagram of FIG. 5, we have:

$k$ denotes the kth DMT symbol;

$\underline{w}(k)$ 505 is a vector of symbols for a single frequency bin;

$\underline{x}(k)$ 525 is a vector of signals to be transmitted in a single frequency bin after MIMO transmitter pre-processing;

$\underline{y}(k)$ 535 is a vector of received signals in a single frequency bin before MIMO receiver post-processing;

$\underline{z}(k)$ 545 is a vector of symbols to be decoded in a single frequency bin after MIMO receiver post-processing;

$\underline{d}(k)$ 515 is the vector of interference signals;

$H_m$ 520 is the main channel matrix for a single frequency bin;

$H_d$ 530 is the interference matrix for a single frequency bin;

B 510 is the transmitter pre-processing matrix for a single frequency bin; and A 550 is the receiver post-processing matrix for a single frequency bin.

Assuming that the prefix is long enough and the time equalizer (TEQ) is designed well enough that there is no Inter-Block Interference (IBI), that $H_m$ is a square full-rank matrix (this is always true if there are an equal number of transmitters and receivers on independent copper pairs), and that the elements of $\underline{d}(k)$ 515 are random variables with $E[\underline{d}(i)\underline{d}^H(j)]=R_d$ for i=j and 0 otherwise, implying that the interference noise is uncorrelated between different symbols; one skilled in the art will recognize that this is only approximately true in practice, but that this approximation is a very good one for all practical purposes.

The pair of matrices A 550 and B 510 are computed with the following properties:

1. B 510 is Hermitian, so that the transmitted signal power is preserved across pairs by the pre-processing operation;

2. $AH_mB=I$, so that the symbol vector component of the received signal is the same as the transmitted symbol vector which allows the received signal to be sliced correctly after receiver post-processing; and 3. $E[AH_d\underline{d}(i)d^H(j)H_d^HA^H]$ is diagonal for i=j and 0 otherwise.

This means that the covariance matrix of the interference noise as seen by the receiver is diagonal within a symbol and zero across symbols. Furthermore, this in turn means that the uncorrelated nature of the interference noise is preserved by the MIMO processing. In addition, the noise at the receiver is uncorrelated between receiver channels which implies that the noise at the receiver is pre-whitened by the MIMO processing.

The algorithm that solves this problem is as follows:

Step 1: C is computed such that $CH_m=I$.

Step 2: B is computed such that $B^HCH_dR_dH_d^HC^HB$ is diagonal and $B^HB=I$.

Step 3: Then $A=B^HC$.

This solution has the following properties:

Property 1 is satisfied by Step 2, which is always feasible.

Property 2 can be verified by substituting the equalities in Step 1 and Step 3 into the expression of the property: $AH_mB=B^HCH_mB=B^HB=I$.

Property 3 is satisfied by Step 2 and Step 3.

The matrix C can be interpreted as a frequency equalizer (FEQ) that performs MIMO transmissions across copper pairs, but not across frequency bins. When there is no in-domain FEXT (i.e., when the matrix $H_m$ 520 is diagonal), C can be implemented via a collection of Single Input Single Output (SISO) FEQ filters, with one FEQ filter per copper pair.

The MIMO processing architecture of FIG. 5 uses the pre-processing matrix B 510 at the transmitter and the post-processing matrix A 550 at the receiver to coordinate the transmitted and received signals in a fashion that preserves the integrity of the transmitted signal $\underline{w}(k)$ 550, while simultaneously pre-whitening the interference noise to create a set of directions in the symbol vector space, namely a subspace, that is free of interference noise. In particular, the interference noise after receiver post-processing is given by $AH_d\underline{d}(k)$. Property 3 shows that this received noise has been diagonalized, which means that the subspace that is orthogonal to the range space of the interference noise vector, namely the nullspace of The interference noise, now contains some of the channels of the multiline system. Hence, those channels are now free of noise and can carry significantly higher bitrates than the channels that are orthogonal to the nullspace of the interference noise, and therefore continue to be impaired. In other words, the MIMO processing of FIG. 5 restricts the effect of the interference noise to the minimum possible number of channels, and therefore is optimal with respect to the criterion of maximizing the overall capacity of the multiline transmission system.

Figure 6:
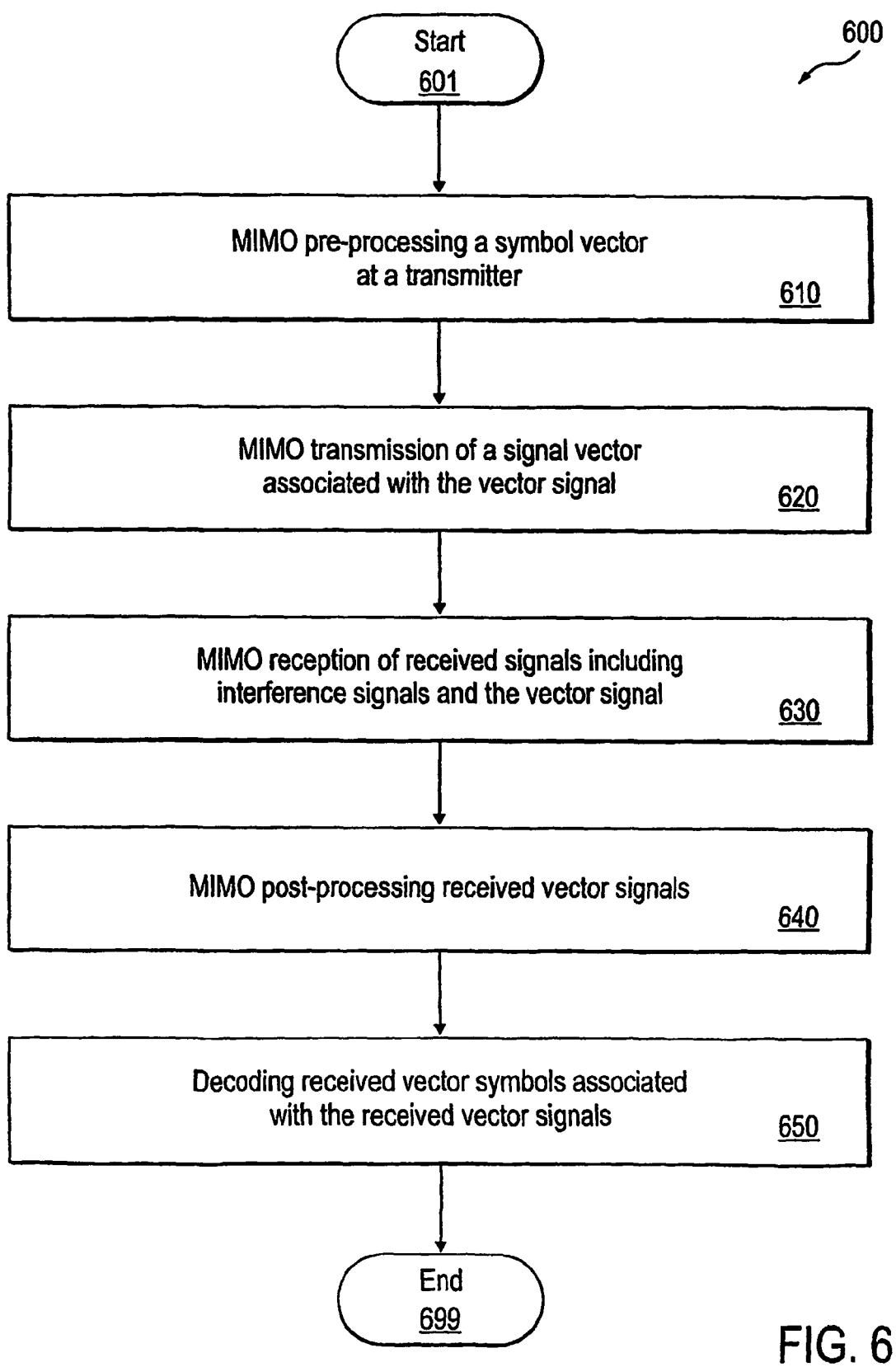
FIG. 6 illustrates an exemplary MIMO transmission process once a processing architecture is computed according to one embodiment of the present invention.

FIG. 6 illustrates an exemplary MIMO transmission process 600 once a processing architecture is computed according to one embodiment of the present invention. Process 600 commences at block 601. At processing block 610, a MIMO pre-processor within a transmitter converts symbol vectors into an associated signal vector. The signal vector is transmitted over multiple lines in a communication system at processing block 620. A signal is received that includes the signal vector and interference signals at processing block 630. At processing block 640, a MIMO post-processor with a receiver convert the received signal vector into a received symbol vector. The received symbols are decoded at processing block 650. The process completes at block 699.

The channels that are now in the nullspace of the interference noise are in principle affected only by thermal noise, typically assumed to have a constant power spectral density (PSD) of −140 dBm/Hz. However, in order to fully exploit this "clean" subspace, it is desirable to deal with several other issues that become major sources of performance impairment in the absence of the dominant interference noise.

2. Receiver Window Shaping

The first of these issues is the "edge-effect" problem that affects all DMT transceivers that use a Fast Fourier Transform (FFT) to convert signals from the time domain to the frequency domain. In single-line systems, this problem manifests itself as "spectral noise leakage" from bins where the noise power is high to bins where the noise power is low. A typical example of this problem is the deterioration of DMT performance in the presence of AM radio-frequency disturbers: even though their spectrum is narrow and should thus affect only 2-3 bins, AM disturber noise "leaks" into many more bins and becomes a very serious problem.

These "edge effects" are more detrimental in the case of a multiline system, because, in addition to spectral leakage across frequency bins, they cause the disturber noise power to spread across multiple transmission channels. This "spatial noise leakage" reduces the dimension of the nullspace of the interference noise, thereby reducing the effectiveness of the MIMO processing and the overall capacity of the multiline transmission system.

Edge effects are caused by the fact that the FFT that converts the received samples from the time domain to the frequency domain is of finite length: To demodulate a received DMT symbol, a time-domain signal equal in length to the symbol must be processed with an FFT. The shorter the DMT symbol, the shorter the FFT. The rate at which data can be transmitted through a DMT system is dependent on the Signal to Noise Ratio (SNR) at each frequency. The finite length of the FFT is equivalent to convolving the spectrum of the noise with a Bartlett window, which "smears" the noise power across many frequency bins. This is not a problem when the noise spectrum is flat, for example with white noise. But when the noise spectrum varies greatly with frequency, as is the case with narrowband AM disturbers, this "smearing" greatly reduces the SNR of bins where the noise would have been very low if the FFT had infinite length. The shorter the FFT, the greater the noise power amplification in these clean bins, and the greater the reduction of SNR and, thus, total bitrate.

These edge effects can be mitigated through a time-domain processing stage that reduces the impairment caused by the finite-length FFT in single-line and multiline systems. This stage is added to the receiver, and, in simple terms, combines the last few samples of data in the prefix (just before the DMT symbol begins) with the last few samples of the DMT symbol. The way the data is combined is defined through a "shaping function." The shaping function is constructed to achieve two goals:

the transmitted signal is reconstructed perfectly; and
the "smearing" of the noise power (as it appears at the output of the FFT) is minimized.

Figure 7:
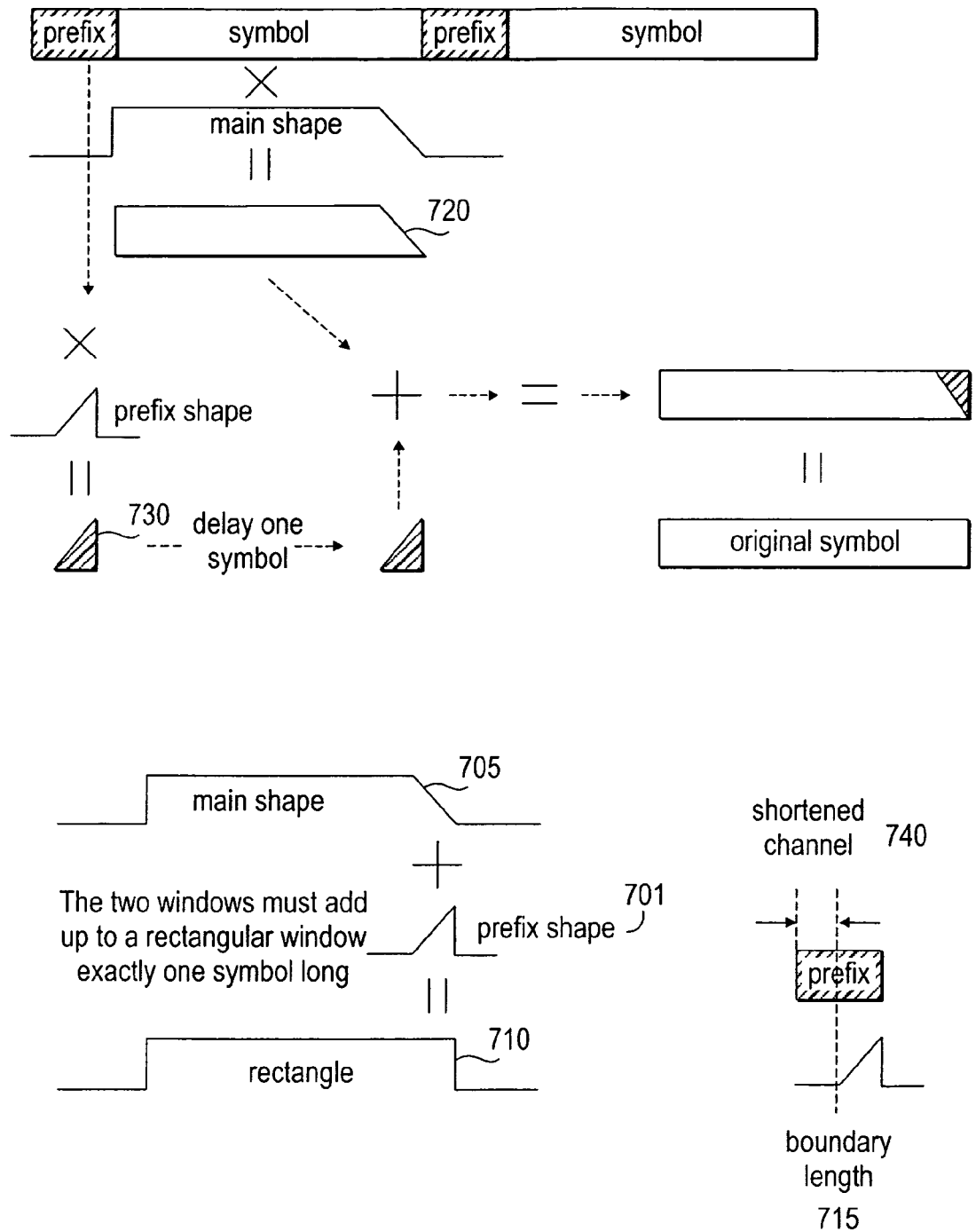
FIG. 7 illustrates a functional block diagram of a window shaping process 700 according to one embodiment of the present invention.

FIG. 7 illustrates a functional block diagram of a window shaping process 700 according to one embodiment of the present invention. A "standard" DMT window is rectangular in shape. FIG. 7 illustrates a receiver window shaping function that shows that it is possible to change the prefix shape 701 and main shape 705 as long as the following two conditions are satisfied:

the prefix shape 701 and main shape 705 add up to a rectangle 710; and
the length of the equalized main channel 720 and the length of the prefix shape 730 added together are less than or equal to the boundary length of the prefix 715.

Under these conditions, the signal strength is invariant with respect to the prefix shape 701. Since the noise does not have a prefix, however, the noise power is not invariant with respect to the prefix. To formulate a relevant optimization criterion, the noise covariance matrix is defined for the ith bin of a multiline system to be $R^i$. The jth singular value of this matrix is $\sigma_j^i$. For a multiline system with MIMO processing, the SNR (in dB) in the ith bin of the jth channel is given by the expression $$SNR_j^i = 10 \log_{10}(p^i) - 10 \log_{10}(\sigma_j^i)$$

where $p^i$ is the power transmitted in the ith bin of the virtual line. This power is fixed by selecting a spectral template consistent with spectral compatibility standards.

The number of bits that can be transmitted in the ith bin of the jth channel is proportional to the SNR in dB. To maximize the overall bitrate for the multiline system, we would like to maximize the sum of the SNRs over all bins and all virtual lines. Since the powers $p^i$ for the bins are fixed, we can maximize the overall bitrate by minimizing the double sum:

$$\sum_{j=1}^{N_{lines}} \sum_{i=1}^{N_{bins}} 10 \log_{10}(\sigma_j^i)$$

Following extensive experimentation with different disturber scenarios, it was concluded that one prefix shape that produces uniformly high bitrates across a wide variety of conditions is the linear shape 701 shown in FIG. 7. In particular, if we allocate n samples to the prefix shape 701, then the values of the shape should be $$\frac{1}{n+1}, \frac{2}{n+1}, \ldots, \frac{n}{n+1}$$

The values 0 and 1 are omitted from the above expression, because they are inherently present in the main shape. This prefix shape achieves the same edge effect suppression as one with the values 0 and 1 included, but with two more samples allocated to data payload instead of prefix overhead.

This type of receiver windowing is similar to the windowing described in the VDSL literature and known as the "Zipper" method. The Zipper method is very useful for mitigating the spectral leakage effects that generate echo noise in VDSL transceivers services. This method uses not only a prefix at the beginning of the transmitted frame, as in conventional DMT schemes, but also a suffix at the end of the transmitted frame. The Zipper scheme synchronizes the timing of the transmitters at both ends of the communications system, and uses the suffix as a buffer that allows the corresponding receivers to delay or advance the start of the received frame. This shifting of the received frame is done so that, at the receiver, the echo noise received from the near-end transmitters, as well as the main signal received from the far-end transmitter, have the circulant property that guarantees the absence of spectral leakage effects after processing by the FFT. This implies that there is no spectral leakage in the echo generated from the near-end transmitter, and therefore that noise is completely contained in a different frequency band than the band used by the far-end transmitter. As a result, the echo noise is eliminated in an FDM scheme such as VDSL.

The Zipper scheme utilizes transmitter and receiver windowing, but the window shapes described in the literature typically have a raised-cosine shape. The receiver windowing scheme illustrated in FIG. 7 utilizes a window only at the receiver, with the goal of mitigating spectral leakage not from its own transmitter, as it is for the Zipper scheme, but from other transmitters in the binder. For this goal, extensive optimization work has shown that the linear window shape described above is more suitable and results in higher performance.

In multiline systems that use an FDM transmission scheme, one can apply the Zipper scheme, as described above, to mitigate the echo from all the near-end transmitters to all the near-end receivers of the multiline system. By adding a suffix at the end of the transmitted frames, and synchronizing all the transmitters at both ends of the multiline system, it is possible to eliminate the echo not only from each receiver's own transmitter, but from all other near-end transmitters as well, since they all transmit synchronized frames that will have the circulant property when received by each receiver.

Figure 8:
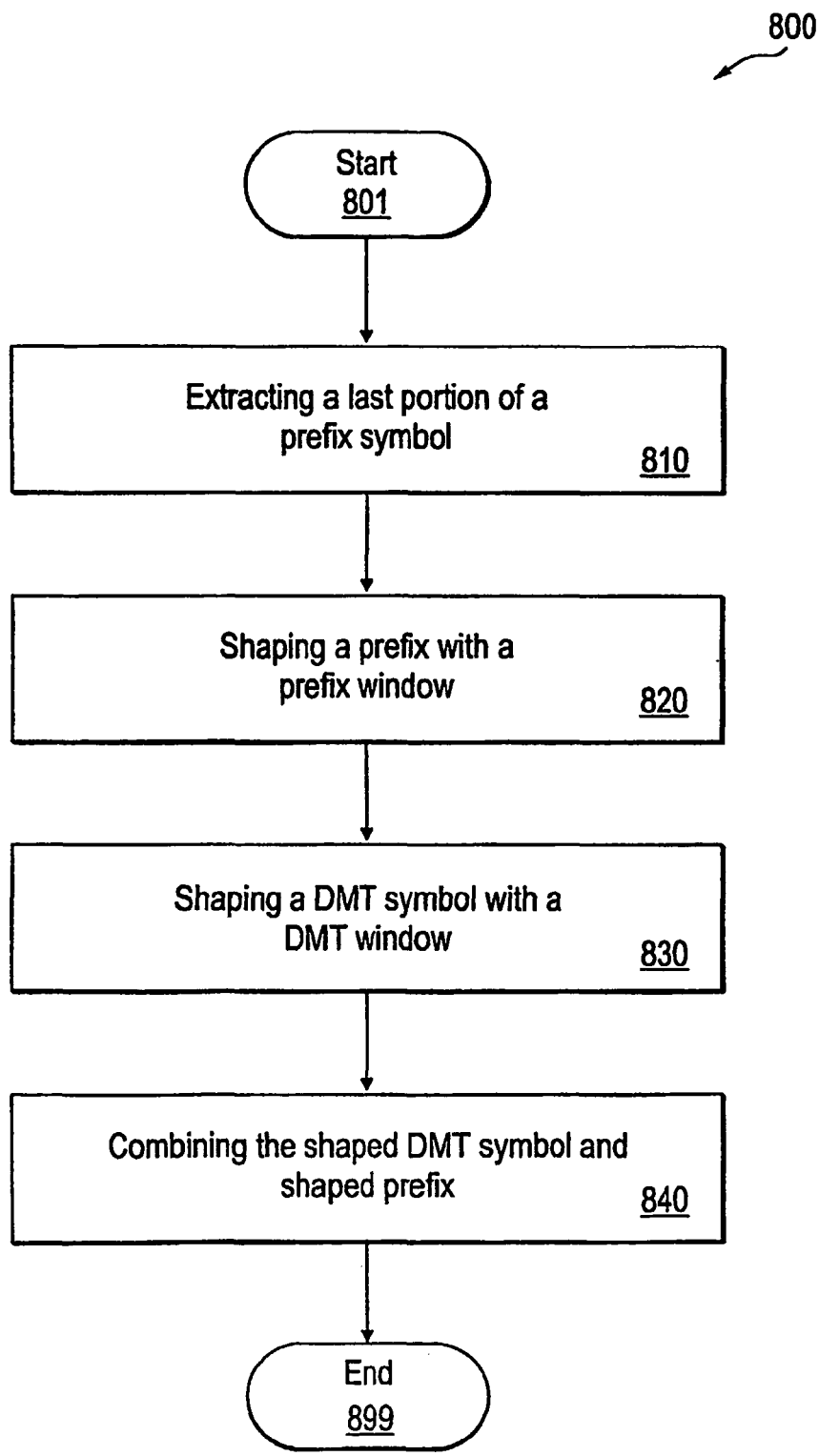
FIG. 8 illustrates an exemplary process for window shaping according to one embodiment of the present invention.

FIG. 8 illustrates an exemplary process 800 for window shaping according to one embodiment of the present invention. Process 800 commences at block 801. At processing block 810, a last portion of a prefix symbol is extracted from a standard prefix. The extracted prefix is shaped as described above with a prefix shaping window at processing block 820. At processing block 830, a last portion of a DMT symbol is shaped with a DMT window. At processing block 840, the shaped DMT and prefix symbols are combined to generated a full rectangular symbol with a length less than or equal to the boundary prefix length.

3. Subspace TEQ Design

Figure 9:
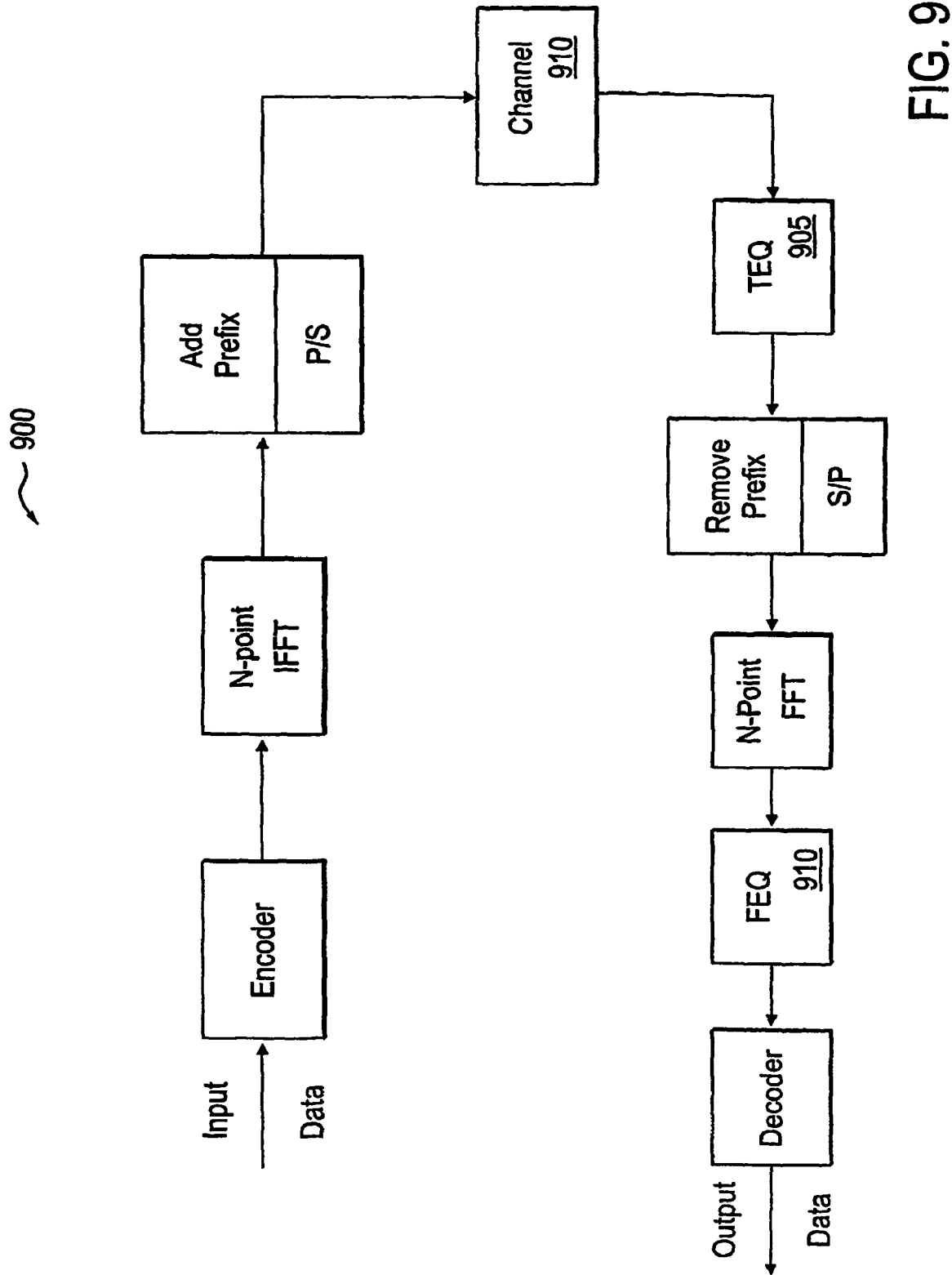
FIG. 9 illustrates an exemplary block diagram of a DMT system such as the multiline transmission system of the present invention according to one embodiment of the present invention.

The second issue that needs to be addressed in a multiline transmission system is the design of a time domain equalizer (TEQ). FIG. 9 illustrates an exemplary block diagram of a DMT system 900 such as the multiline transmission system of the present invention according to one embodiment of the present invention. System 900 includes an FEQ 910 per pair of transmission lines as described above. Time domain equalization techniques are ubiquitous in current DMT systems such as system 900. The purpose of the TEQ 905 is to shorten the otherwise much longer physical channel 910 to within the prefix length such that inter-symbol interference (ISI) can be eliminated. The most common approach to equalization is the minimum mean square error (MMSE) criterion, which is only optimal for single carrier systems. In a multi-carrier system, minimizing the overall mean square error does not necessarily maximize the bitrate. Thus, the performance of MMSE TEQ is far from satisfactory.

Different optimization criteria have been explored to improve TEQ performance, including the minimum ISI (MinISI) solution, the maximum shortening SNR (MSSNR) method, the maximum geometrical SNR (MGSNR) approach, etc. Compared with the MMSE result, these equalizers increase the overall transmission bitrate. Unfortunately, none of these methods is optimal: certain approximations are used in each criterion to simplify the optimization procedure. Even the MGSNR approach, although optimal in theory, is suboptimal in implementation as in practice it is too complicated to realize a true MGSNR TEQ. Published comparisons between these time-domain solutions show that both MMSE and MGSNR TEQs introduce multiple notches in the equalized channel, resulting in a great loss of bit carrying capacity at the corresponding frequency bins, while MinISI and MSSNR TEQs eliminate those nulls and thus achieve a higher data rate.

However, the performance of MinISI and MSSNR TEQs varies from one transmission channel to the next. In the multiline system of the present method and system, these TEQs reduce the number of multiple notches appearing in the MMSE and MGSNR TEQ designs, but they do not completely eliminate them. Since the SNR in the neighborhood of those frequency bins with channel notches is lower, the overall bitrate is decreased. This detrimental effect is much more pronounced in the multiline system of the present method and system, since the SNR of each bin in the "clean" subspace is much higher than in a typical single-line system, and thus the loss of data capacity due to TEQ notches becomes much more significant. Therefore, it is desirable to design a high performance TEQ that is suitable for multiline systems. One such approach is the frequency-domain "per tone equalization" (PTEQ), which leads to a very robust and effective equalizer design. However, the PTEQ employs a completely different implementation structure, which requires a great deal of on-chip memory, thus increasing the cost of practical the existing systems.

In one embodiment, the present TEQ design method is based on a combination of a MSSNR criterion and a subspace method. The resulting TEQ 905, called the "subspace" TEQ, shows comparable performance to that of the optimal PTEQ, but without the increased cost.

Before we develop the idea of the subspace TEQ 905, we briefly introduce the MSSNR design. The MSSNR TEQ and the MinISI TEQ have very similar performance. Since the former uses the channel information only and is less expensive to implement, the MMSNR criterion is the first step in TEQ 905 design.

The MSSNR TEQ design intends to maximize the energy of the portion of the equalized channel impulse response that lies inside a window of length v+1 taps corresponding to the desired length of the shortened channel. At the same time the energy outside this window is constrained. Let v be the prefix length and w be the TEQ response. Given the channel convolution matrix H, define $H_{win}$ as the portion inside a window and $H_{wout}$ as the portion outside of the same window. Then the in-window energy can be expressed as:

$$h_{win}^H h_{win} = w^H H_{win}^H H_{win} w = w^H A w,$$

where $A = H_{win}^H H_{win}$, and the residual is $$h_{wout}^H h_{wout} = w^H H_{wout}^H H_{wout} w = w^H B w,$$

where $B = H_{wout}^H H_{wout}$. Thus, the MSSNR criterion can be formulated as $$\max_w w^H A w \text{ subject to } w^H B w = 1.$$

This is a maximum eigenvalue problem whose solution can be found as:

$$w_{opt} = (\sqrt{B}^H)^{-1} 1_{max}$$

where $1_{max}$ is the unit length eigenvector associated with the maximum eigenvalue $\lambda_{max}$ of the composite matrix C which is defined as $$C = (\sqrt{B})^{-1} A (\sqrt{B}^H)^{-1}.$$

Thus, the maximum eigenvalue of C for different delays is searched for, and the MSSNR TEQ corresponds to the one that has the largest eigenvalue among all possible delays.

Generally, the matrix B is positive definite, and hence $\sqrt{B}$ can be computed via the Cholesky decomposition. However, B is channel dependent and in some cases it does not satisfy the positive definiteness requirement due to numerical inaccuracies. A simple and effective way to fix this problem is to pre-condition the matrix by adding a small positive term, which is based on the fact that if B is not positive definite, its negative eigenvalue is usually very close to zero, and thus a small conditioning number will be sufficient to remove the negative eigenvalues from B. This modification leads to $\bar{B} = B + \beta I$, where $\beta > 0$ assumes a comparatively small value; the modified matrix $\bar{B}$ is then used instead of B in the equations above.

The rationale behind the subspace TEQ method originates from the following observation: the maximum eigenvalue of the matrix C associated with the optimal delay sometimes is not dominant, which means that there exist a few eigenvalues, though smaller than the largest one, still comparable to the largest one and much larger than the rest. These eigenvalues are combined, instead of just selecting the largest one, in order to find a better TEQ.

The subspace TEQ 905 combines the subspace method with the MSSNR design rule. The resulting TEQ 905 performs a two-step optimization procedure: First, the optimal delay is determined using the MSSNR criterion, and a few dominant eigenvectors of the composite matrix corresponding to this delay are obtained. Second, an optimization is performed over the subspace spanned by these eigenvectors and the optimal TEQ coefficients are computed.

Let $\lambda_{max,1} > \ldots > \lambda_{max,K}$ be the K largest eigenvalues of $C_{opt}$, which is the composite matrix computed at the optimal delay. The corresponding eigenvectors are denoted as $1_{max,1} \ldots 1_{max,K}$. Rather than using $1_{max} = 1_{max,1}$ in determining the optimal TEQ (in the sense of maximum shortening SNR) as $w_{opt} = (\sqrt{\bar{B}}^H)^{-1} 1_{max}$, we may choose to use $1_{max} = \alpha_1 1_{max,1} + \ldots + \alpha_K 1_{max,K}$ instead, where $\alpha_1, \ldots, \alpha_K$ are positive scalars. Thus, $$w = \alpha_1 1_{max,1} + \ldots + \alpha_K 1_{max,K} = L\alpha$$

where $$L = [1_{max,1} \ldots 1_{max,K}], \alpha = [\alpha_1 \ldots \alpha_K]^T.$$

So the next step is to optimize w by choosing a "good" $\alpha$. To achieve a higher bitrate, the bitrate is maximized over $\alpha$ to obtain the optimal equalizer coefficients:

$$w_{opt} = L\alpha_{opt}, \alpha_{opt} = \arg\max_\alpha f(\alpha)$$

where $f(\alpha)$ is a function of $\alpha$ that represents the overall bitrate. The function $f(\alpha)$ is calculated in two steps. First, the SNR in each bin is calculated as a function of the TEQ impulse response (and hence as a function of $\alpha$). Then, the bit-loading formula is applied to the calculated SNRs.

This cost function is a non-linear one and requires gradient-based optimization procedures. Other simpler suboptimal cost functions are also possible. The proposed framework allows a linear parameterization of the TEQ impulse response within a subspace that guarantees good ISI properties and facilitates further optimization within that subspace.

Figure 10:
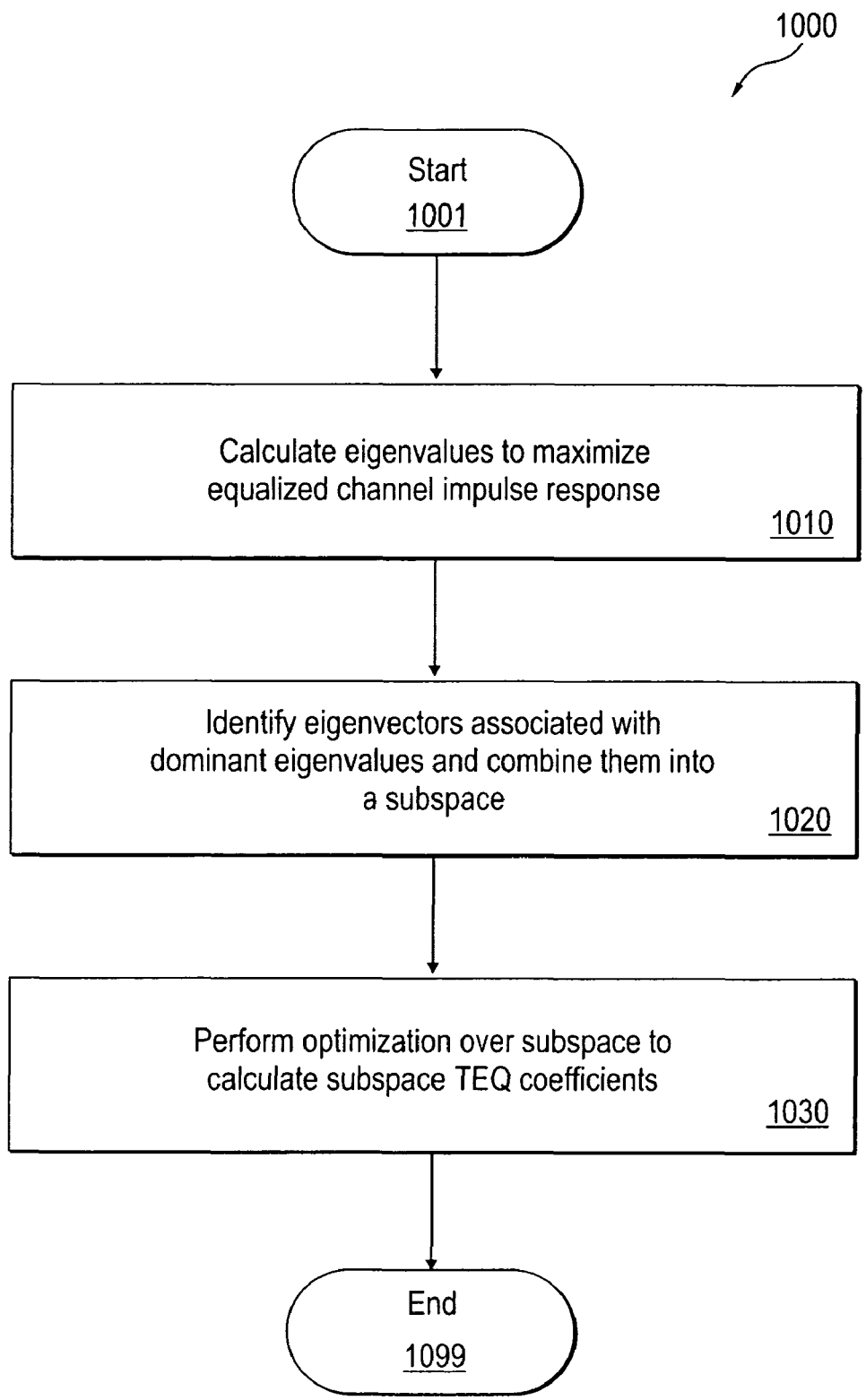
FIG. 10 illustrates an exemplary embodiment of a process for creating a subspace TEQ according to one embodiment of the present invention.

FIG. 10 illustrates an exemplary embodiment of a process 1000 for creating a subspace TEQ according to one embodiment of the present invention. The process 1000 begins at block 1001. At processing block 1010, eigenvalues are calculated to maximize an equalized channel impulse response. As described above, the dominant eigenvalues are combined at processing block 1020. At processing block 1030, an optimization over the subspace is performed to calculate the subspace TEQ coefficients. The process 1000 ends at bock 1099.

4. Improved AFE Design

When the multiline system of the present invention uses an FDM transmission scheme, application of the Zipper scheme described above can eliminate the echo from all the near-end transmitters. On the other hand, if the multiline system uses an overlapped-spectrum transmission scheme, in which the upstream and downstream transmitters utilize frequency bands that overlap at least partially, the echo cancellation task is shifted to the Analog Front End (AFE) hybrid circuit design. Of course, a good hybrid design is always desirable, even in the case of FDM transmission.

Figure 11:
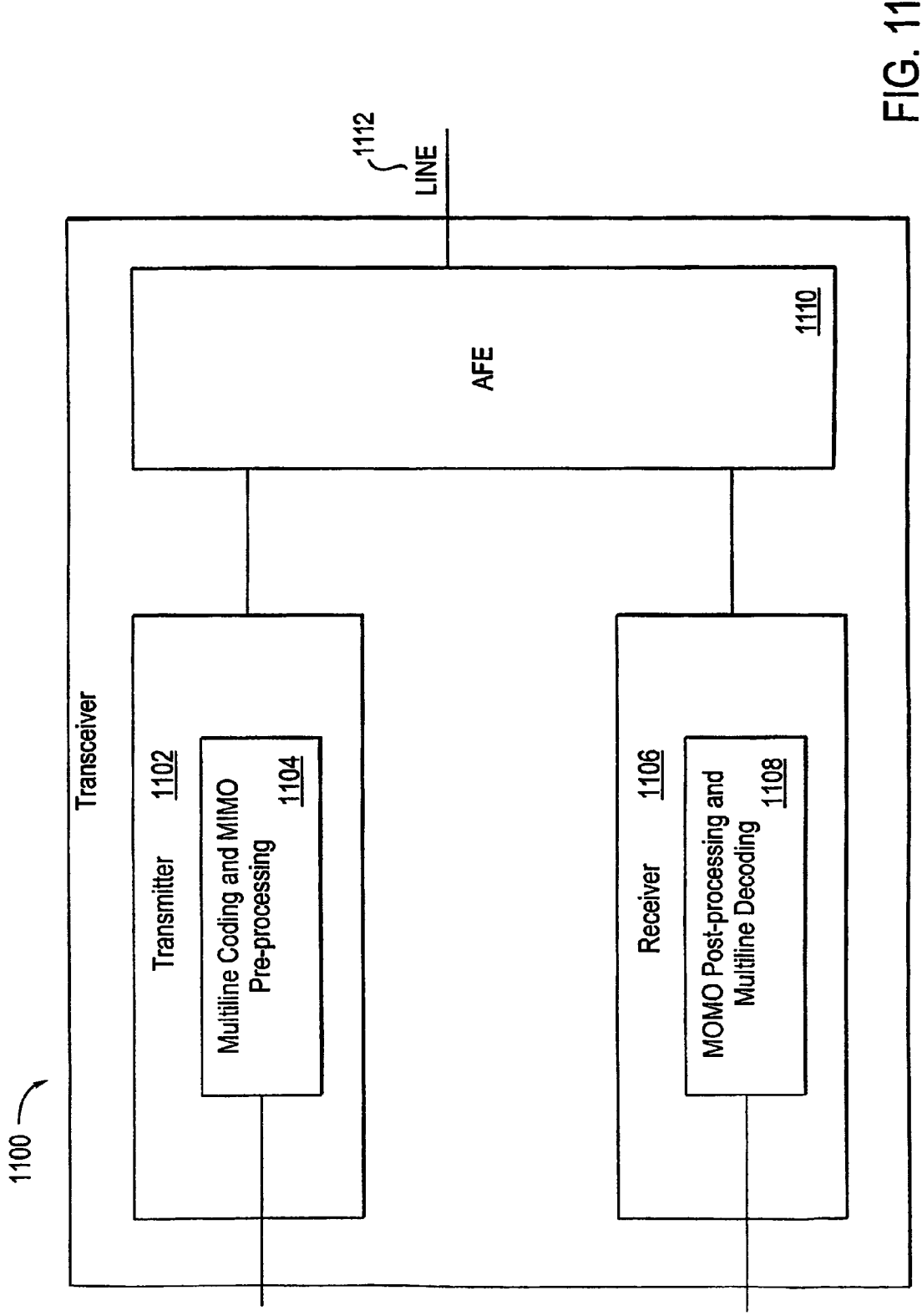
FIG. 11 illustrates one embodiment of a transceiver within a DSL modem.

FIG. 11 illustrates a typical embodiment of a transceiver 1100 within a DSL modem (see FIG. 2). The transceiver 1100 includes a transmitter 1102, a receiver 1106, and an AFE 1110. The transmitter 1102 receives outgoing signals to be processed by the multiline coding and MIMO processing module 1104 and transmitted to the AFE 1110. The AFE 1110 transmits the outgoing signal down the bi-directional line 1112 and to the portion of the echo rejection circuit for filtering incoming signals. The filtered signal is the combination of the incoming signal from the bi-directional line 1112 and the outgoing (transmitted) signal passed through the echo rejection portion of the AFE 1110. The receiver 1106 receives and processes the filtered signal in the MIMO processing and multiline decoding module 1108 for digital transmission toward its destination.

In the design of a multiline system, the AFE is critical for reducing analog echo, which is the rejection of the residual signal from the transmitter that is present at the receiver. An AFE circuit with improved echo cancellation requires the ability to model the entire circuit, including a very accurate model of the transmission line, an understanding of the theoretical framework that relates gain and phase in a complex circuit, and an understanding of the conditions under which parallel transfer functions add to form an equivalent non-minimum phase transfer function.

The problem of modeling the discrete components in AFE circuitry is fairly straightforward. This is usually in a SPICE environment, however, without a good two-port model of a transmission line, SPICE modeling is useless. Fortunately, good analytical two-port models of transmission lines exist, and are expressed in the form:

$$\begin{bmatrix} V_1 \\ I_1 \end{bmatrix} = \begin{bmatrix} A & B \\ C & D \end{bmatrix} \begin{bmatrix} V_2 \\ I_2 \end{bmatrix}$$

Unfortunately, this format is not readily adapted to SPICE. Nevertheless, with some elementary linear algebraic formulae, this may be converted to the format:

$$\begin{bmatrix} I_1 \\ I_2 \end{bmatrix} = \begin{bmatrix} E & F \\ G & H \end{bmatrix} \begin{bmatrix} V_1 \\ V_2 \end{bmatrix}$$

This expression can be implemented as a circuit using standard "E" blocks with SPICE. These blocks accept voltages as inputs and produce as outputs currents with some inherent gain. Since the resulting variables E, F, G, and H are frequency dependent, the "E" block must include a lookup table that describes the complex gain as a function of frequency with sufficient resolution. This was done using a MATLAB script that completely transformed the analytical two-port model above into a SPICE library script that could be imported into SPICE as an integral circuit block.

Using an accurate transmission line model to compensate for gain and phase shifts due to complex impedances, it is possible to design an AFE circuit with high echo rejection. One embodiment of the present invention includes a prebalance circuit with a high-pass filter stage at both the HY and RX inputs and with the signal from the line provided by a separate coil on the transformer (see FIG. 12).

Figure 12:
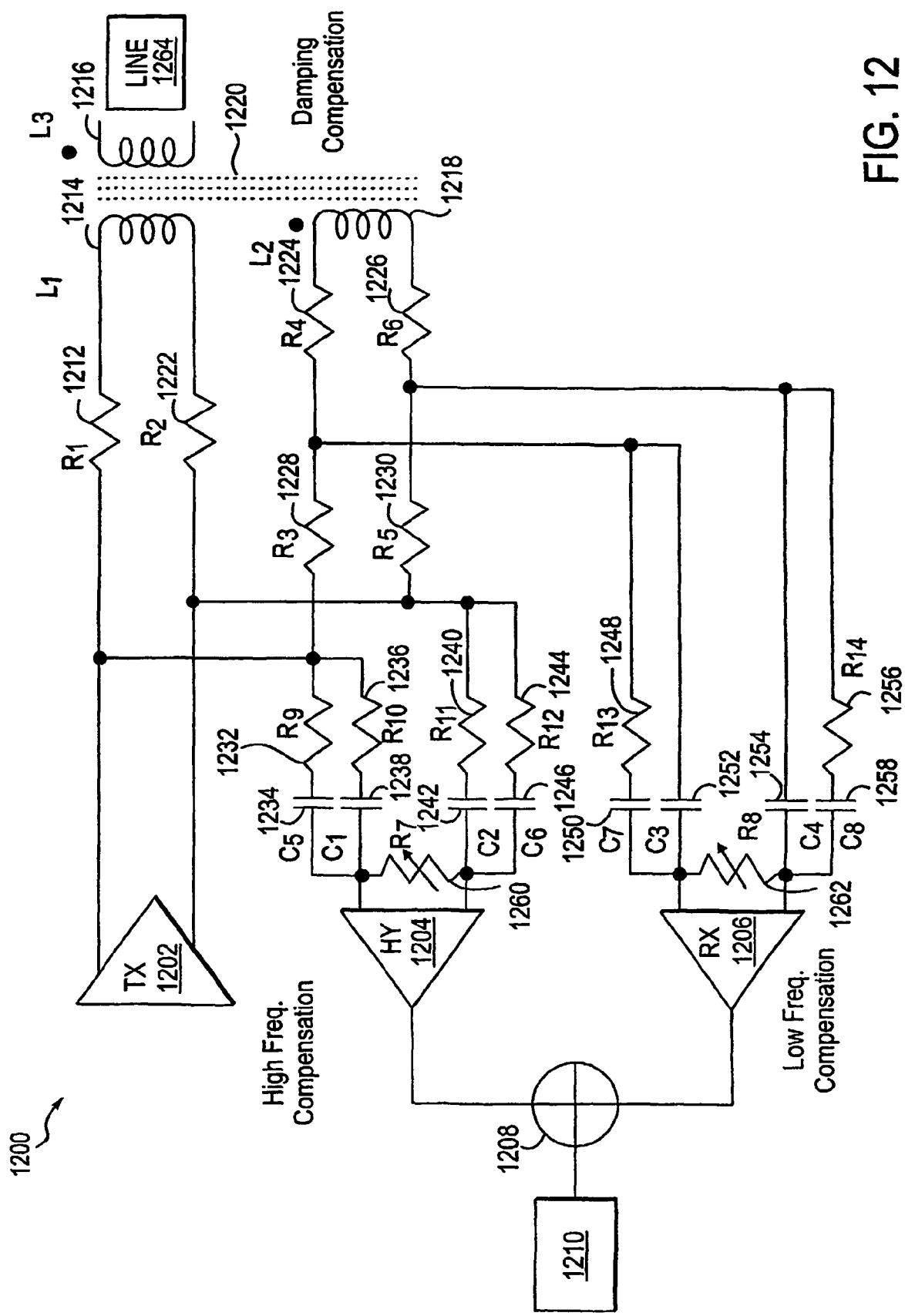
FIG. 12 is an illustration of one embodiment of the present invention for reducing echo in an AFE.

FIG. 12 is an illustration of one embodiment of the present invention for reducing echo in an AFE. The circuit 1200 is a fully differential circuit including passive components (i.e. resistors, inductors, and capacitors) and active components (i.e. amplifiers). The data to be transmitted is converted from a digital signal to an analog signal by the transmit digital-to-analog converter (DAC)/line driver (TX) 1202, dropped over drive resistors R1 1212 and R2 1222 and coupled to the line 1264 via transformer 1220. Transformer 1220 includes inductors L1 1214, L2 1218, and L3 1216. The echo is reduced at component 1210 by measuring the transmitted signal at the hybrid inputs (HY) 1204 and the signal from inductor L2 1218 of transformer 1220 at receiver inputs (RX) 1206, and composing the received signal as some linear combination of both at summing junction 1208. In varying embodiments, the gain at HY 1204 input may be adjusted within a small range about unity, while RX 1206 input has unity gain. Further, the resistance as seen between the HY 1204 inputs and the RX 1206 inputs is controlled by variable resistors R7 1260 and R8 1262 respectively.

In one embodiment of the present invention, to maintain a minimum phase transfer function from the TX 1202 outputs to the RX 1206 inputs, the polarity of the connection between the TX 1202 outputs and RX 1206 inputs is reversed in contrast to current designs. Further, varying the ratio of resistors R3 1228 to R4 1224 and R5 1230 to R6 1226 maintains the appropriate amount of dampening of the transfer function.

In situations where the circuit appears to have a slightly under-damped roll-up at low frequencies (below the corner frequency of the high-pass filter to the RX 1206 inputs) creating a mismatched in phase at the HY 1204 and RX 1206 inputs, one embodiment of the present invention utilizes a high-pass filter circuit at the RX 1206 inputs. This high-pass filter circuit provides low frequency compensation by including two parallel passes where each pass includes two branches. The first pass includes one branch with capacitor C3 1252 and another branch with capacitor C7 1250 in series with a resistor R13 1248. The second pass includes one branch with capacitor C4 1254 and the other branch with capacitor C8 1258 in series with a resistor R14 1256. These elements shape the gain slope of the roll-up of the TX 1202 to RX 1206 transfer function so that it rises more slowly, ensuring that the phases at the HY 1204 and RX 1206 inputs are a closer match at low frequencies.

In other situations where the effect of the leakage inductance of transformer 1220 increases the effective impedance of transformer 1220 creating a phase mismatch at the HY 1204 and RX 1206 inputs at high frequencies (around 350 kHz and above), an embodiment of the present invention utilizes a high-pass filter circuit at the HY 1204 inputs. This high-pass filter circuit provides high frequency compensation by including two parallel passes where each pass includes two branches. The first pass includes one branch with a capacitor C5 1234 in series with a resistor R9 1232 and another branch with capacitor C1 1238 in series with a resistor R10 1236. The second pass includes one branch with a capacitor C2 1242 in series with a resistor R11 1240 and the other branch with capacitor C6 1246 in series with a resistor R12 1244. These elements shape the gain slope of the TX 1202 to HY 1204 transfer function so that it rises more slowly, ensuring that the phases at the HY 1204 and RX 1206 inputs are a closer match at high frequencies.

Table 1 illustrates values for the various components of an exemplary embodiment of the present invention.

TABLE 1

| CIRCUIT ELEMENT | FIGURE 12 |
| --- | --- |
| $R_1, R_2$ | 2.4 Ω |
| $R_3, R_5$ | 200 Ω |
| $R_4, R_6$ | 50 Ω |
| $R_7, R_8$ | Variable 300-6000 Ω |
| $R_9, R_{12}$ | 1 Ω |
| $R_{10}, R_{11}$ | 60 Ω |
| $R_{13}, R_{14}$ | 4.99 kΩ |
| $C_1, C_2$ | 3.3 nF |
| $C_3, C_4$ | 3.9 nF |
| $C_5, C_6$ | 470 pF |
| $C_7, C_8$ | 18 nF |
| $L_1$ | 148 μH |
| $L_2$ | 245 μH |
| $L_3$ | 3 mH |

Figure 13:
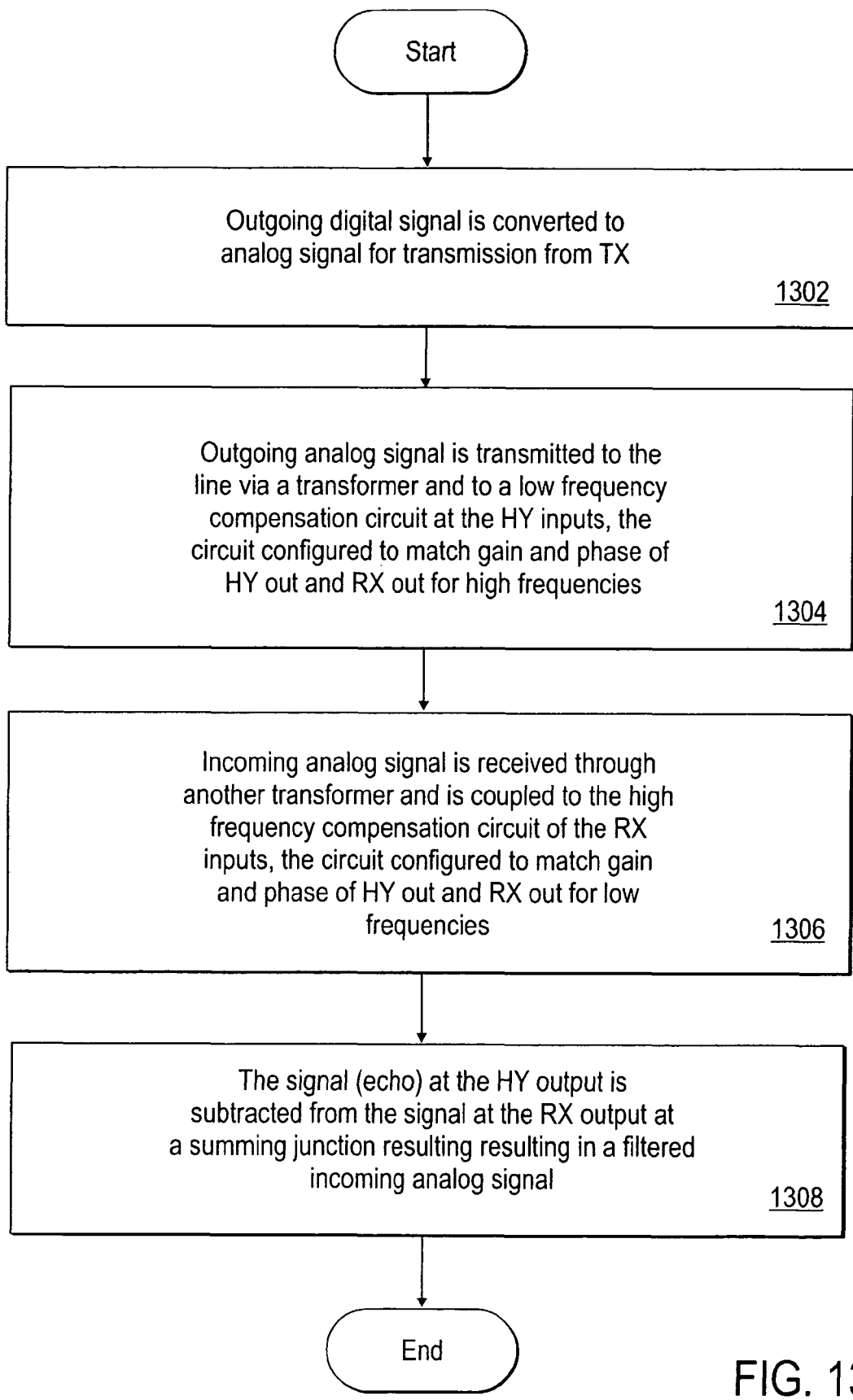
FIG. 13 illustrates one embodiment of the present invention as executed in an AFE circuit for reducing transmission echo.

FIG. 13 illustrates one embodiment of the present invention as executed in an AFE circuit for reducing transmission echo. An outgoing digital signal is converted to an analog signal by the transmit DAC (digital to analog converter) (step 1302). The line driver TX transmits the outgoing analog signal to the line out via a transformer and to a high frequency compensation circuit coupled to the HY inputs (step 1304). The high frequency compensation circuit is a high pass circuit including two parallel passes configured to change the TX to RX transfer function such that the phases at the HY and RX inputs more closely match at low frequencies. The incoming analog signal is received through another transformer connected to the line and is further transmitted to the high frequency compensation circuit coupled to the inputs of the RX inputs (step 1306). The high frequency compensation circuit is a high pass circuit including two parallel passes configured to change the TX to HY transfer function such that the phases at the HY and RX inputs more closely match at high frequencies. The echo signal at the HY output is then subtracted from the RX output at a summing junction resulting in a filtered incoming analog signal (step 1308).

In the foregoing specification, the invention has been described with reference to specific embodiments. It will, however, be evident that various modifications and changes can be made without departing from the broader spirit and scope of the invention as set forth in the claims. The specification and drawings are, accordingly, to be regarded in an illustrative rather than a restrictive sense.

What is claimed is:

1. A method, comprising:
   mitigating spectral leakage in DMT (Discrete Multi-Tone) receivers, wherein mitigating spectral leakage comprises designing a receiver window to reduce edge effects of an IFFT/FFT transformation;
   applying the receiver window to a received signal in a time domain;
   using a FFT to convert the received signal into a frequency-domain symbol;
   reducing the length of the receiver window by not including 0 as a first coefficient or 1 as a last coefficient in receiver window coefficients;
   multiplying samples in a last part of a prefix of the received signal by the receiver window coefficients to generate a first result;
   multiplying the samples in the last part by the receiver window coefficients subtracted from 1 to generate a second result;
   adding the first result and second result to generate modified samples; and
   substituting the modified samples into the last part of the received signal.

2. The method of claim 1, further comprising: designing a shape of the receiver window by maximizing a bitrate of a DMT system for a given set of disturber environments.

3. The method of claim 1, further comprising: determining a length of the receiver window by maximizing a bitrate of a DMT system for the given set of disturber environments.

4. The method of claim 1, wherein the shape of the receiver window is linear.

5. The method of claim 1, wherein the length of the receiver window is between 5 and 20 samples.

6. A method, comprising mitigating spectral leakage in DMT (Discrete Multi-Tone) receivers, wherein mitigating spectral leakage comprises designing a receiver window to reduce edge effects of an IFFT/FFT transformation;
   using the receiver window in a multiline communications system having multiple twisted copper pairs as a single multiline communications channel, and physical-layer signals coordinated across multiple transmitters and/or across multiple receivers;
   applying the receiver window to a received signal in a time domain;
   using a FFT to convert the received signal into a frequency-domain symbol;
   multiplying samples in a last part of a prefix of the received signal by the receiver window coefficients to generate a first result;
   multiplying the samples in the last part by the receiver window coefficients subtracted from 1 to generate a second result;
   adding the first result and second result to generate modified samples; and
   substituting the modified samples into the last part of the received signal.

7. The method of claim 6, further comprising using the receiver window to mitigate spectral leakage across one or more frequency bins and across one or more receivers of the multiline communications system.

8. The method of claim 6, further comprising determining a shape of the receiver window by maximizing a bitrate of a DMT system for a given set of disturber environments.

9. The method of claim 6, determining a length of the receiver window by maximizing a bitrate of a DMT system for the given set of disturber environments.

10. The method of claim 6, wherein the shape of the receiver window is linear.

11. The method of claim 6, wherein the length of the receiver window is between 5 and 20 samples.

12. The method of claim 6, further comprising reducing the length of the receiver window by not including 0 as a first coefficient or 1 as a last coefficient in receiver window coefficients.

13. A method, comprising:
mitigating crosstalk between multiple lines of a multiline communications system, comprising using a Zipper scheme, including a prefix and suffix, to synchronize transmitters and receivers across the multiple lines of the multiline communications system, wherein the multiline communications system has multiple twisted copper pairs as a single multiline communications channel, and physical layer signals coordinated across multiple transmitters and/or across multiple receivers;
using a transmission scheme with non-overlapped upstream and downstream spectra; and
mitigating self-echo to each receiver of the two or more receivers using the Zipper scheme, wherein the self-echo is caused by a transmitter corresponding to each receiver of the two or more receivers due to spectral leakage from an upstream frequency band into a downstream frequency band and vice versa.

14. The method of claim 13, further comprising:
mitigating self-crosstalk to each of the one or more receivers of the multiline communications system using the Zipper scheme; and
utilizing a transmission scheme with non-overlapped upstream and downstream spectra with the multiline communications system,
wherein the self-crosstalk is caused by one or more transmitters, and by spectral leakage from an upstream frequency band into a downstream frequency band and vice versa.

15. The method of claim 13, further comprising:
mitigating self-echo to each of the one or more receivers of the multiline communications system using the Zipper scheme; and
utilizing a transmission scheme with overlapped upstream and downstream spectra with the multiline communications system,
wherein the self-echo is caused by one or more transmitters, and by spectral leakage from an upstream frequency band into a downstream frequency band and vice versa.

16. The method of claim 15, wherein mitigating self-echo comprises using a frequency-domain digital echo canceller in each of the one or more receivers of the multiline communications system, wherein the digital echo canceller comprises one single-tap echo cancellation filter in each of the frequency bins of the one or more frequency bins that are used by each receiver of the two or more receivers and are located in an overlapped part of the upstream band and downstream frequency band.

17. The method of claim 13, further comprising:
mitigating self-crosstalk to each receiver of the one or more receivers of the multiline communications system using the Zipper scheme; and
utilizing a transmission scheme with overlapped upstream and downstream spectra with the multiline communications system,
wherein the self-crosstalk is caused by one or more transmitters, and by overlap of an upstream frequency band and downstream frequency band.

18. The method of claim 17, further comprising:
mitigating the self-crosstalk by using a frequency-domain vector digital crosstalk canceller in each receiver of the two or more receivers of the multiline communications system, wherein the vector digital crosstalk canceller comprises a set of single-tap crosstalk cancellation filters in each frequency bin of the two or more frequency bins that are used by each receiver of the two or more receivers and are located in the overlapped upstream and downstream frequency spectra, where there is one less single-tap crosstalk cancellation filter than transmitters of the multiline communications system.

19. A system, comprising:
means for mitigating spectral leakage in DMT (Discrete Multi-Tone) receivers, wherein mitigating spectral leakage comprises means for designing a receiver window to reduce edge effects of an IFFT/FFT transformation;
means for applying the receiver window to a received signal in a time domain;
means for using a FFT to convert the received signal into a frequency-domain symbol;
means for reducing the length of the receiver window by not including 0 as a first coefficient or 1 as a last coefficient in receiver window coefficients;
means for multiplying samples in a last part of a prefix of the received signal by the receiver window coefficients to generate a first result;
means for multiplying the samples in the last part by the receiver window coefficients subtracted from 1 to generate a second result;
means for adding the first result and second result to generate modified samples; and
means for substituting the modified samples into the last part of the received signal.

20. The system of claim 19, further comprising means for designing a shape of the receiver window by maximizing a bitrate of a DMT system for a given set of disturber environments.

21. The system of claim 19, further comprising means for determining a length of the receiver window by maximizing a bitrate of a DMT system for the given set of disturber environments.

22. The system of claim 19, wherein the shape of the receiver window is linear.

23. The system of claim 19, wherein the length of the receiver window is between 5 and 20 samples.

24. The system of claim 19, further comprising means for using the receiver window to mitigate spectral leakage across one or more frequency bins and across one or more receivers of the multiline communications system.

25. The system of claim 19, further comprising means for determining a shape of the receiver window by maximizing a bitrate of a DMT system for a given set of disturber environments.

26. The system of claim 19, means for determining a length of the receiver window by maximizing a bitrate of a DMT system for the given set of disturber environments.

27. A system, comprising:
means for mitigating spectral leakage in DMT (Discrete Multi-Tone) receivers, wherein mitigating spectral leakage comprises means for designing a receiver window to reduce edge effects of an IFFT/FFT transformation;

means for using the receiver window in a multiline communications system having multiple twisted copper pairs as a single multiline communications channel, and physical-layer signals coordinated across multiple transmitters and/or across multiple receivers;

means for applying the receiver window to a received signal in a time domain;

means for using a FFT to convert the received signal into a frequency-domain symbol;

means for multiplying samples in a last part of a prefix of the received signal by the receiver window coefficients to generate a first result;

means for multiplying the samples in the last part by the receiver window coefficients subtracted from 1 to generate a second result;

means for adding the first result and second result to generate modified samples; and means for substituting the modified samples into the last part of the received signal.

28. The system of claim 27, wherein the shape of the receiver window is linear.

29. The system of claim 27, wherein the length of the receiver window is between 5 and 20 samples.

30. The system of claim 27, further comprising means for reducing the length of the receiver window by not including 0 as a first coefficient or 1 as a last coefficient in receiver window coefficients.

31. A system, comprising:

means for mitigating crosstalk between multiple lines of a multiline communications system, comprising means for using a Zipper scheme, including a prefix and suffix, to synchronize transmitters and receivers across the multiple lines of the multiline communications system, wherein the multiline communications system has multiple twisted copper pairs as a single multiline communications channel, and physical-layer signals coordinated across multiple transmitters and/or across multiple receivers;

means for using a transmission scheme with non-overlapped upstream and downstream spectra; and means for mitigating self-echo to each receiver of the two or more receivers using the Zipper scheme, wherein the self-echo is caused by a transmitter corresponding to each receiver of the two or more receivers due to spectral leakage from an upstream frequency band into a downstream frequency band and vice versa.

32. The system of claim 31, further comprising:

means for mitigating self-crosstalk to each of the one or more receivers of the multiline communications system using the Zipper scheme; and means for utilizing a transmission scheme with non-overlapped upstream and downstream spectra with the multiline communications system, wherein the self-crosstalk is caused by one or more transmitters, and by spectral leakage from an upstream frequency band into a downstream frequency band and vice versa.

33. The system of claim 31, further comprising:

means for mitigating self-echo to each of the one or more receivers of the multiline communications system using the Zipper scheme; and means for utilizing a transmission scheme with overlapped upstream and downstream spectra with the multiline communications system, wherein the self-echo is caused by one or more transmitters, and by spectral leakage from an upstream frequency band into a downstream frequency band and vice versa.

34. The system of claim 33, wherein means for mitigating self-echo comprises means for using a frequency-domain digital echo canceller in each of the one or more receivers of the multiline communications system, wherein the digital echo canceller comprises one single-tap echo cancellation filter in each of the frequency bins of the one or more frequency bins that are used by each receiver of the two or more receivers and are located in an overlapped part of the upstream band and downstream frequency band.

35. The system of claim 31, further comprising:

means for mitigating self-crosstalk to each receiver of the one or more receivers of the multiline communications system using the Zipper scheme; and means for utilizing a transmission scheme with overlapped upstream and downstream spectra with the multiline communications system, wherein the self-crosstalk is caused by one or more transmitters, and by overlap of an upstream frequency band and downstream frequency band.

36. The system of claim 35, further comprising:

means for mitigating the self-crosstalk by using a frequency-domain vector digital crosstalk canceller in each receiver of the two or more receivers of the multiline communications system, wherein the vector digital crosstalk canceller comprises a set of single-tap crosstalk cancellation filters in each frequency bin of the two or more frequency bins that are used by each receiver of the two or more receivers and are located in the overlapped upstream and downstream frequency spectra, where there is one less single-tap crosstalk cancellation filter than transmitters of the multiline communications system.

37. A computer readable medium, having stored thereon:

computer-readable instructions, which when executed in a computer system, cause the computer system to mitigate spectral leakage in DMT (Discrete Multi-Tone) receivers by using a receiver window to reduce edge effects of an IFFT/FFT transformation;

computer-readable instructions, which when executed in the computer system, cause the computer system to:
apply the receiver window to a received signal in a time domain; and
use a FFT to convert the received signal into a frequency-domain symbol;

computer-readable instructions, which when executed in the computer system, cause the computer system to reduce the length of the receiver window by not including 0 as a first coefficient or 1 as a last coefficient in receiver window coefficients; and computer-readable instructions, which when executed in the computer system, cause the computer system to:
multiply samples in a last part of a prefix of the received signal by the receiver window coefficients to generate a first result;
add the first result and second result to generate modified samples; and
substitute the modified samples into the last part of the received signal.

38. The computer readable medium of claim 37, further having stored thereon computer-readable instructions, which when executed in the computer system, cause the computer system to design a shape of the receiver window by maximizing a bitrate of a DMT system for a given set of disturber environments.

39. The computer readable medium of claim 37, further having stored thereon computer-readable instructions, which when executed in the computer system, cause the computer system to determine a length of the receiver window by maximizing a bitrate of a DMT system for the given set of disturber environments.

40. The computer readable medium of claim 37, wherein the shape of the receiver window is linear.

41. The computer readable medium of claim 37, wherein the length of the receiver window is between 5 and 20 samples.

42. A computer readable medium, having stored thereon:
computer-readable instructions, which when executed in a computer system, cause the computer system to mitigate spectral leakage in DMT (Discrete Multi-Tone) receivers by using a receiver window to reduce edge effects of an IFFT/FFT transformation;
computer-readable instructions, which when executed in the computer system, cause the computer system to use the receiver window in a multiline communications system having multiple twisted copper pairs as a single multiline communications channel, and physical-layer signals coordinated across multiple transmitters and/or across multiple receivers.

43. The computer readable medium of claim 42, further having stored thereon computer-readable instructions, which when executed in the computer system, cause the computer system to use the receiver window to mitigate spectral leakage across one or more frequency bins and across one or more receivers of the multiline communications system.

44. The computer readable system of claim 42, further having stored thereon computer-readable instructions, which when executed in the computer system, cause the computer system to determine a shape of the receiver window by maximizing a bitrate of a DMT system for a given set of disturber environments.

45. The computer readable medium of claim 42, further having stored thereon computer-readable instructions, which when executed in the computer system, cause the computer system to determine a length of the receiver window by maximizing a bitrate of a DMT system for the given set of disturber environments.

46. The computer readable medium of claim 42, further having stored thereon computer-readable instructions, which when executed in the computer system, cause the computer system to:
apply the receiver window to a received signal in a time domain; and
use a FFT to convert the received signal into a frequency-domain symbol.

47. The computer readable medium of claim 46, wherein the shape of the receiver window is linear.

48. The computer readable medium of claim 46, wherein the length of the receiver window is between 5 and 20 samples.

49. The computer readable medium of claim 46, further having stored thereon computer-readable instructions, which when executed in the computer system, cause the computer system to reduce the length of the receiver window by not including 0 as a first coefficient or 1 as a last coefficient in receiver window coefficients.

50. The computer readable medium of claim 46, further having stored thereon computer-readable instructions, which when executed in the computer system, cause the computer system to:
multiply samples in a last part of a prefix of the received signal by the receiver window coefficients to generate a first result;
multiply the samples in the last part by the receiver window coefficients subtracted from 1 to generate a second result; and
add the first result and second result to generate modified samples; and
substituting the modified samples into the last part of the received signal.

51. A computer readable medium, having stored thereon:
computer-readable instructions, which when executed in a computer system, cause the computer system to:
mitigate crosstalk between multiple lines of a multiline communications system by using a Zipper scheme, including a prefix and suffix, to synchronize transmitters and receivers across the multiple lines of the multiline communications system, wherein the multiline communications system has multiple twisted copper pairs as a single multiline communications channel, and physical-layer signals coordinated across multiple transmitters and/or across multiple receivers; and
computer-readable instructions, which when executed in the computer system, cause the computer system to:
use a transmission scheme with non-overlapped upstream and downstream spectra; and
mitigate self-echo to each receiver of the two or more receivers using the Zipper scheme, wherein the self-echo is caused by a transmitter corresponding to each receiver of the two or more receivers due to spectral leakage from an upstream frequency band into a downstream frequency band and vice versa.

52. The computer readable medium of claim 51, further having stored thereon computer-readable instructions, which when executed in the computer system, cause the computer system to:
mitigate self-crosstalk to each of the one or more receivers of the multiline communications system using the Zipper scheme; and
utilize a transmission scheme with non-overlapped upstream and downstream spectra with the multiline communications system,
wherein the self-crosstalk is caused by one or more transmitters, and by spectral leakage from an upstream frequency band into a downstream frequency band and vice versa.

53. The computer readable medium of claim 51, further having stored thereon computer-readable instructions, which when executed in the computer system, cause the computer system to:
mitigate self-echo to each of the one or more receivers of the multiline communications system using the Zipper scheme; and
utilize a transmission scheme with overlapped upstream and downstream spectra with the multiline communications system,
wherein the self-echo is caused by one or more transmitters, and by spectral leakage from an upstream frequency band into a downstream frequency band and vice versa.

54. The computer readable medium of claim 53, further having stored thereon computer-readable instructions, which when executed in the computer system to mitigate self-echo, cause the computer system to use a frequency-domain digital echo canceller in each of the one or more receivers of the multiline communications system, wherein the digital echo canceller comprises one single-tap echo cancellation filter in each of the frequency bins of the one or more frequency bins that are used by each receiver of the two or more receivers and are located in an overlapped part of the upstream band and downstream frequency band.

55. The computer readable medium of claim 51, further having stored thereon computer-readable instructions, which when executed in the computer system, cause the computer system to:

mitigate self-crosstalk to each receiver of the one or more receivers of the multiline communications system using the Zipper scheme; and utilize a transmission scheme with overlapped upstream and downstream spectra with the multiline communications system, wherein the self-crosstalk is caused by one or more transmitters, and by overlap of an upstream frequency band and downstream frequency band.

56. The computer readable medium of claim 55, further having stored thereon computer-readable instructions, which when executed in the computer system, cause the computer system to:

mitigate the self-crosstalk by using a frequency-domain vector digital crosstalk canceller in each receiver of the two or more receivers of the multiline communications system, wherein the vector digital crosstalk canceller comprises a set of single-tap crosstalk cancellation filters in each frequency bin of the two or more frequency bins that are used by each receiver of the two or more receivers and are located in the overlapped upstream and downstream frequency spectra, where there is one less single-tap crosstalk cancellation filter than transmitters of the multiline communications system.

* * * * *